United States Patent
Kaper

(10) Patent No.: US 12,433,309 B2
(45) Date of Patent: Oct. 7, 2025

(54) VEGETABLE BASED PRODUCTS AND USES THEREOF

(71) Applicant: FSK CONSULTING, LLC, Pennington, NJ (US)

(72) Inventor: Frederik S. Kaper, Pennington, NJ (US)

(73) Assignee: FSK CONSULTING, LLC, Pennington, NJ (US)

(*) Notice: Subject to any disclaimer, the term of this patent is extended or adjusted under 35 U.S.C. 154(b) by 199 days.

(21) Appl. No.: 17/735,487

(22) Filed: May 3, 2022

(65) Prior Publication Data
US 2023/0284663 A1    Sep. 14, 2023

Related U.S. Application Data

(63) Continuation of application No. 14/784,155, filed as application No. PCT/US2014/344409 on Apr. 16, 2014, now Pat. No. 11,350,654.

(60) Provisional application No. 61/812,468, filed on Apr. 16, 2013.

(51) Int. Cl.
| | |
|---|---|
| A23L 19/10 | (2016.01) |
| A23L 19/00 | (2016.01) |
| A23L 33/24 | (2016.01) |
| C08B 37/00 | (2006.01) |
| C08L 5/00 | (2006.01) |

(52) U.S. Cl.
CPC ............. *A23L 19/10* (2016.08); *A23L 19/03* (2016.08); *A23L 33/24* (2016.08); *C08B 37/0054* (2013.01); *C08L 5/00* (2013.01)

(58) Field of Classification Search
CPC ....................................................... A23L 19/03
See application file for complete search history.

(56) References Cited

U.S. PATENT DOCUMENTS

| | | |
|---|---|---|
| 4,565,705 A | 1/1986 | Snider |
| 4,871,574 A | 10/1989 | Yamazaki et al. |
| 5,234,696 A | 8/1993 | Van Scoik et al. |
| 6,840,361 B1 | 1/2005 | Jackson |
| 2004/0266727 A1 | 12/2004 | Brandon |
| 2006/0141117 A1 | 6/2006 | Bossard et al. |
| 2007/0003678 A1 | 1/2007 | Zehentbauer et al. |
| 2009/0311370 A1 | 12/2009 | Ogura et al. |

FOREIGN PATENT DOCUMENTS

| | | |
|---|---|---|
| EP | 1179299 A2 | 2/2002 |
| FR | 2891112 A3 | 3/2007 |
| WO | 2008068572 A2 | 6/2008 |
| WO | 2008068572 A3 | 9/2008 |

(Continued)

OTHER PUBLICATIONS

Leroux Technical Brochure Chicory Flour; Leroux SAS, May 13, 2009, www.leroux.com.

(Continued)

*Primary Examiner* — Elizabeth Gwartney
(74) *Attorney, Agent, or Firm* — Hudak, Shunk & Farine Co. LPA

(57) ABSTRACT

Methods of manufacturing high fiber vegetable product, compositions including high fiber vegetable product, food or animal feed ingredients including high fiber vegetable product, and foods or animal feeds including high fiber vegetable products are provided.

11 Claims, 7 Drawing Sheets

(56) References Cited

FOREIGN PATENT DOCUMENTS

WO    2011008095 A1    1/2011

OTHER PUBLICATIONS

Supplementary European Search Report for application EP 14 78 5359; dated Nov. 8, 2016.
Teris A Van Beek, Bitter Sesquiterpene Lactones from Chicory Roots, Journal of Agricultural & Food Chemistry, Apr. 1990, 1035-1038, vol. 38, No. 4, American Chemical Society.
Mona I Massoud, Chemical and Technological Studies on Chicory (*Cichorium intybus* L) and its Applications in Some Functional Food, J. Adv. Agric. Res., 2009, 735-756, vol. 14(3), Egypt.

VEGETABLE BASED PRODUCTS AND USES THEREOF

FIELD OF THE INVENTION

The disclosure relates to high fiber vegetable products, methods of manufacturing the high fiber vegetable products, and end products including the high fiber vegetable products.

BACKGROUND OF THE INVENTION

On average US consumers ingest 40% (15 gram/day) of the daily Adequate Intake (AI) for fiber according to the Dietary Guidelines from the USDA, issued in 2010.

It is commonly accepted that fibers have beneficial physiological effects in humans such as maintaining normal bowel function and body weight, reducing the risk of diabetes, CVD and certain types of cancer (IOM, 2005).

Traditional fiber sources, as cereal-based bran, do not have the adequate technological, textural or sensory properties to create high fiber containing foods that are palatable.

Processed foods with nutrient claims for 'good' (2.5 gram/serving) or 'excellent' (5 gram/serving) source of fiber, usually contain so-called 'soluble, low viscous' fibers.

Commercially applied soluble, low viscous fibers are processed chemically or/and enzymatically from corn starch or sugar and refined in order to use as food ingredients such as 'polydextrose', 'soluble corn fiber', 'resistant maltodextrin', 'resistant dextrin', 'short chain fructooligosaccharides' (scFOS).

A natural source for soluble, low viscous dietary fiber is inulin, a fructan. It is commercially applied into a range of food products and dietary supplements. Inulin is well validated by human clinical trials as a prebiotic, bifidogenic source at a consumption of 5 grams/day. These soluble, low molecular, slightly sweet carbohydrates are easy to formulate into processed foods due to their physico-chemical properties. Current commercially manufactured Inulin is recovered in a pure form, by using raw plant material and separating plant-fractions in a multi-step refinery process, also yielding side streams. The current commercial processes include two stages of processing; 1) pretreatment, and 2) purification. In the pretreatment stage, root or tuber from chicory or Jerusalem artichoke is washed, sliced, and extracted. The pretreatment products then enter the purification stage. In purification, the process stream is subjected to separation (creating an insoluble fiber/protein fraction as a side stream); demineralization with ion-exchange resins (creating minerals, peptides, and bitter components as a side stream); de-bittering and de-colorization with ion exchange and activated carbon (creating color and bitter component side streams); concentrating; microfiltration (creating another insoluble fraction side stream); and evaporation, drying and packing. The product produced by this process has about 90% inulin; 9% sugars (fructose, glucose, saccharose); and less than 1% other components. The product may contain about 5% moisture. In addition, the product produced by the process includes less than 0.2% protein and less than 0.1% potassium. The byproduct (22-27% of solids) recovered in the side stream includes insoluble fibers and proteins and may be used for feed, compost, or other purposes. The effluent (6% of solids) also recovered in the side stream includes minerals, peptides, and regeneration liquids that may be used in water treatment plants. These commercialized processes require substantial capital investments and various process aids, including those required to process the side streams, resulting into a considerable ecological footprint. The prior commercial processes result in a relatively high cost per unit of inulin in order to be applied as dietary fiber.

U.S. Pat. No. 5,840,361 discloses baby food compositions from fructan-rich vegetables and methods for preparation. This reference demonstrates that certain fructan-rich products have negative flavor attributes, which prevents incorporation of the compositions into baby food.

Leroux ((a) Technical Brochure Chicory Flour; Leroux SAS. 2009 May 13; and (b) US 2006/0141117 A1; Jun. 26, 2006 Use of chicory flour for preparing food dough) described dried, milled chicory roots (product name FC07) that are applied as a dough improver in bread at 0.8-1.5% relative to the flour component. At higher dosages, which are required in order to make claim for 'good' and 'excellent' source of fiber, the bread products show off-colors (grey/brown) and cause strong negative aftertaste.

EP 1179299 A2 describes roots that are cut, blanched, milled and separated into a soluble and insoluble fraction. The soluble chicory extract then undergoes UV treatment Or is treated at alkaline conditions (pH>10) and elevated temperature in order to eliminate negative flavor components.

U.S. Pat. No. 4,871,574 describes a flour made from Jerusalem artichoke tubers (JAF) that contains high level saccharides, including reducing: 20-30% mono- and disaccharides (glucose, fructose, sucrose) and 30-35% oligosaccharides with dP (degree of polymerization) of 3-5. These qualities make the product very hygroscopic, tan colored, with a sweet/salty-caramel taste. Due to agronomic and production issues, JAF is considered an expensive vegetable powder to produce. Due to its physico-chemical properties, JAF is unacceptable to substitute 5-15% flour from grains and delivering comparable product qualities.

SUMMARY OF THE INVENTION

In an aspect, the invention relates to a method of manufacturing a high fiber vegetable product. The vegetable matter is selected from at least one of root, tubers, or leaves of a plant having inulin as a reserve carbohydrate. The method includes bathing, dipping or rinsing the vegetable matter with water. The water includes at least one substance selected from the group consisting of an antioxidant, a textural support agent and an acidulant. The acidulant may be an organic acidulant. The method includes heating the vegetable matter to a temperature of 40° C. to 90° C. The method includes also wounding the vegetable matter. The steps of bathing, dipping or rinsing, heating, and wounding are conducted in any order or with one or more of the steps combined.

In an aspect, the invention relates to a bittering component removed from the vegetable matter by any one of methods described herein.

In an aspect, the invention relates to a high fiber vegetable product manufactured by any one of the methods described herein.

In an aspect, the invention relates to a high fiber vegetable product. The high fiber vegetable product includes a total dietary fiber and mono- and disaccharides. The total dietary fiber includes inulin, soluble fiber other than inulin and insoluble fiber. The amount of the total dietary fiber is 30 to 90% (w/w) [weight relative to total weight of dry solids] of the high fiber vegetable product. The amount of the mono- and disaccharides is 1 to 10% (w/w) of the high fiber vegetable product. The amount of inulin is 30 to 75% (w/w) of the high fiber vegetable product. The amount of soluble fiber other than inulin is 1 to 10% (w/w) of the high fiber vegetable product. The amount of the insoluble fiber is 1 to 10% (w/w) of the high fiber vegetable product. The high fiber vegetable product may be in a processed form.

In an aspect, the invention relates to a high fiber vegetable product. The high fiber vegetable product includes a total dietary fiber. The total dietary fiber includes inulin, soluble fiber other than inulin, and insoluble fiber. The amount of the total dietary fiber is 30 to 90% (w/w) of the high fiber vegetable product. The amount of inulin is 30% to 75% (w/w) of the high fiber vegetable product. The amount of the soluble fiber other than inulin is 1 to 10% (w/w) of the high fiber vegetable product. The amount of the insoluble fiber is 1 to 10% of the high fiber vegetable product. The high fiber vegetable product may be in a processed form.

In an aspect, the invention relates to a food product that includes any one of the high fiber vegetable products described herein.

BRIEF DESCRIPTION OF THE DRAWINGS

The following detailed description of embodiments will be better understood when read in conjunction with the appended drawings. For the purpose of illustration, there are shown in the drawings embodiments, which are presently preferred. It is understood, however, that the invention is not limited to the precise arrangements and instrumentalities shown. In the drawings.

DETAILED DESCRIPTION OF EMBODIMENTS

Figure 1:
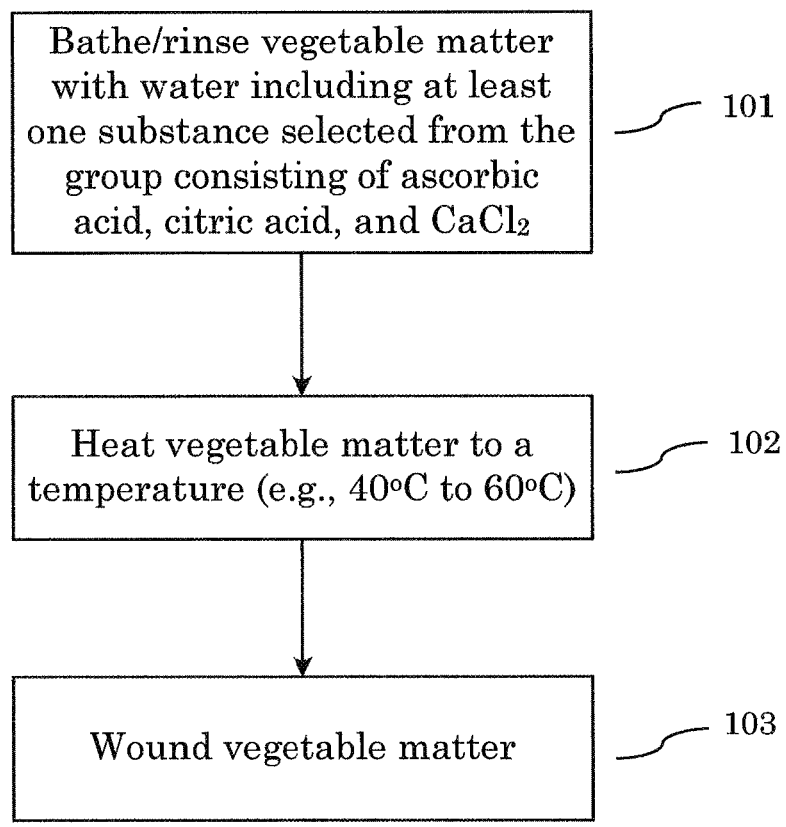
FIG. 1 illustrates a method of manufacturing high fiber vegetable product.

Certain terminology is used in the following description for convenience only and is not limiting. The words "right", "left", "top", and "bottom" designate directions in the drawings to which reference is made. The words "a" and "one", as used in the claims and in the corresponding portions of the specification, are defined as including one or more of the referenced item unless specifically stated otherwise. The phrase "at least one" followed by a list of two or more items, such as "A, B, or C", means any individual one of A, B or C as well as any combination thereof.

Referring to FIG. 1, an embodiment of a method of manufacturing high fiber vegetable product is illustrated. The method may include manufacturing a high fiber vegetable product by inhibiting production of bitter components in vegetable matter. The method may include inactivating bitter components in vegetable matter. The method may include removing bitter components from the vegetable matter. The bitter components may be those normally produced in response to wounding.

As used herein, the phrase "bitter components" refers to sesquiterpenes. The sesquiterpenes may be sesquiterpene lactones produced by plants belonging to the Asteraceae family. Many plants of the Asteraceae family have ducts and/or trichomes, containing enzymes and/or precursors to form sesquiterpene lactones. These sesquiterpene lactones may be secreted by plants upon wounding of the plant organs or tissues. The bitter taste of the plants may be associated with the secreted sesquiterpene lactones. Sesquiterpene lactones may include but are not limited to guaianolides, eudesmanolides, or germacranolides. The gualanolides may include at least one of lactucin, 8-deoxylactucin, and lactucopicrin.

The vegetable matter may be one or more of root, tubers, or leaves of a plant having inulin as a reserve carbohydrate. The vegetable matter may be any other part of the plant. The vegetable matter may derive from a plant belonging to the Asteraceae family. The plant may be but is not limited to chicory (*Cichorium intybus*), globe artichoke (*Cynara scolymus*), Jerusalem artichoke (*Helianthus tuberosus*), endive (*Cichorium endive*), Belgian endive (*Cichorium intybus* var. *sativum*), dandelion (*Taraxacum officinale*), dahlia (Dahlia ssp.), burdock (*Arctium lappa*), salsify (*Tragopogon porrifolius*), and yacon (*Smallanthus sonchifolius*). The vegetable matter may be derived from any agricultural crop with a high concentration of inulin and/or other dietary fibers at concentration of at least 20% (w/w) of solids.

Referring to FIG. 1, the method may include bathing, dipping or rinsing the vegetable matter with water in washing step 101. The water may include components that inactivate bitter component production. The water may include components that inhibit bitter components. The water may include components that inactivate production of and inhibit bitter components. The water may remove bitter components. The water may include preservatives. The water may include agents to inhibit browning. The water may include at least one substance selected from the group consisting of an antioxidant, a textural support agent and an organic acidulant.

In an embodiment, the water may include an antioxidant. The antioxidant may be an inhibitor of one or more enzymes involved in forming bitter sesquiterpene lactones. The inhibitor may be an acidulant, preferably, an organic acidulant. The organic acidulant may be but is not limited to ascorbic acid, citric acid, erythorbic acid, lactic acid, gluconic acid, malic acid or salts thereof. The salts thereof may be potassium salts or sodium salts. The salts may be but are not limited to at least one of potassium ascorbate, potassium citrate, potassium erythorbate, potassium lactate, potassium gluconate, sodium ascorbate, sodium citrate, sodium erythorbate, sodium lactate, or sodium gluconate, sodium malate. The water may include an agent that inactivates sesquiterpene lactones. The agent may include sulfhydryl or sulfite groups. The agent may be but is not limited to L-cysteine, L-cysteine HCl, thiol containing peptides, papaya extract, one or more proteases, sodium bisulfite ($NaHSO_3$), or potassium bisulfite ($KHSO_3$). The water may include one or more chelating or sequestering agents. The chelating or sequestering agents may bind or trap metal ions included in plant enzymes involved in the formation of bitter sesquiterpene lactones. The metal ions may be but are not limited to ions of Fe, Cu, Mg or Ca. The metal ions may be but are not limited to $Fe^{2+}$, $Fe^{3+}$, $Cu^+$, $Cu^{2+}$, $Mg^{2+}$ or $Ca^{2+}$. The chelating or sequestering agents may be but are not limited to ethylendiamine tetraacetic acid (EDTA), sodium pyrophosphate $Na_4P_2O_7$, potassium pyrophosphate ($K_4P_2O_7$), or sodium acid pyrophosphate ($Na_2H_2P_2O_7$). The water may include a complexing agent. The complexing agent may entrap active sites responsible for bitterness of sesquiterpene lactones. The complexing agent may be but is not limited to cyclodextrin. The water may include a textural support agent. The textural support agent may be used for treating and preserving texture of root and tuber pieces. The textural support agent may be but is not limited to $CaCl_2$, Ca-gluconate, Ca-lactate, Ca-lactategluconate.

Referring to FIG. 1, the method may further include heating the vegetable matter in heating step 102 to inactivate and inhibit further bitter component production. The vegetable matter may be heated to a temperature of 40° C. to 90° C. Heating may be accomplished at least in part by having the water at or above the described temperature. Referring to FIG. 1, the method may also include wounding the vegetable matter in wounding step 103.

In an embodiment, if the wounding occurs after bathing, dipping or rinsing the method may further include a second step of bathing, dipping or rinsing after wounding.

In an embodiment, the temperature may be a temperature of 40° C., 41° C., 42° C., 43° C., 44° C., 45° C., 46° C., 47° C., 48° C., 49° C., 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C. 70° C., 75° C., 80° C., 85° C., 90° C., 95° C., 100° C., 40° C. to 45° C., 40° C. to 55° C., 40° C. to 65° C., 40° C. to 75° C., 40° C. to 85° C., 40° C. to 95° C., 40° C. to less than 100° C., 65° C. to 75° C., 65° C. to 95° C., 65° C. to less than 100° C., 75° C. to 95° C., 75° C. to less than 100° C., or 95° C. to less than 100° C. The temperature may be less than any one of the foregoing values. The temperature may be 45° C. to 60° C.

In an embodiment, wounding may include mechanical processing of the vegetable matter to obtain a mechanically processed matter. The mechanical processing may include sizing. Sizing may include cutting top or tail of any one of root, tuber or leaves of the vegetable matter. The mechanical processing may include any other known sizing procedure. The mechanical processing may include at least one procedure selected from group consisting of: cutting, peeling, dicing shredding, slicing, grinding, and milling. The steps of bathing, dipping or rinsing, heating, and wounding may be conducted in any order or with one or more of the steps combined. The method may further include washing the vegetable matter prior to the steps of bathing or rinsing, heating and wounding. The step of mechanical processing may be conducted before the steps of at least one of bathing, dipping or rinsing or heating. The step of mechanical processing may be conducted after the steps of at least one of bathing, dipping or rinsing or heating. The step of mechanical processing may be conducted after bathing, dipping or rinsing but before heating. The step of mechanical processing may be conducted after heating but before bathing, dipping or rinsing. The bathing, dipping, or rinsing and heating steps may be accomplished at least partially by having the water have a temperature at or above the described temperature for heating. The method may include cold storage of the vegetable matter at any one point after bathing or rinsing, heating and wounding. The method may further include cold storage of the mechanically processed matter. Storing the vegetable matter or the mechanically processed matter may be conducted at a storing temperature of 0-20° C. The storing temperature may be a temperature of 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 0° C. to 5° C., 0° C. to 10° C., 0° C. to 15° C., 0° C. to 20° C., 0° C. to less than 20° C., 5° C. to 20° C., 10° C. to 20° C., 15° C. to less than 20° C., 5° C. to 15° C., 10° C. to less than 20° C., or 15° C. to less than 20° C. The storing temperature may be less than any one of the foregoing values. The storing temperature may be less than 0° C.

In an embodiment, the method may further include cooling the mechanically processed matter. Cooling the mechanically processed matter may include cooling to a temperature of 0-20° C. The cooling temperature may be a temperature of 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 0° C. to 5° C., 0° C. to 10° C., 0° C. to 15° C., 0° C. to 20° C., 0° C. to less than 20° C., 5° C. to 20° C., 10° C. to 20° C., 15° C. to less than 20° C., 5° C. to 15° C., 10° C. to less than 20° C., or 15° C. to less than 20° C. The cooling temperature may be less than any one of the foregoing values.

In an embodiment, the method may further include dipping the mechanically processed matter into water. The method may include rinsing the mechanically processed matter with water. The method may include spraying the mechanically processed matter with water. The water may include any one of the antioxidant described herein. The water may include any one of the complexing agents described herein. The water may include any one of the textural support agents described herein. The textural support agent may be used for treating and preserving texture of root and tuber pieces. The water may include at least one substance selected from the group consisting of: ascorbic acid, citric acid, erythorbic acid, lactic acid, gluconic acid, malic acid, potassium ascorbate, potassium citrate, potassium erythorbate, potassium lactate, potassium gluconate, sodium ascorbate, sodium citrate, sodium erythorbate, sodium lactate, sodium gluconate, sodium malate, cyclodextrin, sodium pyrophosphate, sodium acid pyrophosphate, potassium pyrophosphate, potassium acid pyrophosphate, L-cysteine, L-cysteine-HCL, thiol containing peptides, extract, proteases, sodium bisulfite, potassium bisulfite, EDTA, $CaCl_2$, Ca-lactate, Ca-gluconate, and Ca-lactategluconate.

In an embodiment, the method may further include drying the mechanically processed matter. Drying may include removing moisture by hot air. A hot air temperature may be 50 to 90° C. The hot air temperature may be a temperature of 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C. 70° C., 75° C., 80° C., 85° C., 90° C., 95° C., 100° C., 50° C. to 55° C., 50° C. to 65° C., 50° C. to 75° C., 30° C. to 85° C., 50° C. to 95° C., 50° C. to less than 100° C., 50° C. to 65° C., 50° C. to 75° C., 50° C. to 95° C., 50° C. to less than 100° C., 65° C. to 75° C., 65° C. to 95° C., 65° C. to less than 100° C., 75° C. to 95° C., 75° C. to less than 100° C., or 95° C. to less than 100° C. The hot air temperature may be less than any one of the foregoing values.

In an embodiment, the method may further include homogenizing the mechanically processed matter to obtain a suspension. The method may also include separating the suspension to obtain soluble and insoluble fractions of the suspension. The step of separating may be performed by any known procedure. The step of separating may include at least one procedure selected from the group consisting of: filtrating, extracting, decanting, coagulating, ion exchanging, and evaporating. After, the step of separating, the suspension may include at least 25% (w/w) of solids. The method may further include further evaporating the liquid included in the suspension. The method may further include decanting the liquid included in the suspension. After evaporating or decanting, the suspension may include greater than 25% (w/w) solids, or at least 75% (w/w) solids. The method may further include treating the solution with inulinase. The inulinase may be the enzyme 2,1-β-D-fructan fructanohydrolase (EC 3.2.1.7) that catalyzes the endo-hydrolysis of (2,1)-β-D-fructosyl linkages in inulin. Inulinase may be but is not limited to inulase, endoinulinase, endo-inulinase, exoinulinase, or 2,1-β-D-fructan fructanohydrolase.

The method may further include drying the suspension to obtain a high fiber vegetable product. The method may include further processing the high fiber vegetable product. The method may include pulverizing the high fiber vegetable products. The method may include mixing the high fiber vegetable product with one or more other components. The method may include processing the high fiber vegetable product into any form. The high fiber vegetable product may be processed into the fiber rich powder. The high fiber vegetable product may be processed into the oligofructose syrup. The high fiber vegetable product may be processed into fiber rich chips, dry filtercake, fiber rich slices, inulin, or oligofructose. The method may include packaging of the high fiber vegetable product. The method may include harvesting side stream components. A side stream component may be a bittering component.

In an embodiment, a bittering component is provided. The bittering component may be removed from the vegetable matter by any one of the methods described herein. The bittering component may be one or more sesquiterpene lactones removed from the vegetable matter. The one or more sesquiterpene lactones may be but are not limited to dihydro lactucin glycoside, dihydro lactucin oxalate, lactucin glycoside, lactucin oxalate, dihydro lactucin, lactucin, deoxylactucin glycoside, dihydro deoxylactucin glycoside, deoxylactucin oxalate, dihydro deoxylactucin oxalate, deoxylactucin, dihydro deoxylactucin, lactucopricrin oxalate, dihydro lactucopricrin oxalate, lactucopricrin, or dihydrolactucopricrin.

In an embodiment, a high fiber vegetable product is provided. The high fiber vegetable product may be manufactured by any method described herein.

In an embodiment, a high fiber vegetable product is provided and may include a total dietary fiber and mono- and disaccharides. The total dietary fiber may include inulin, soluble fiber other than inulin, and insoluble fiber. The amount of the total dietary fiber may be 30 to 90% (w/w) of the high fiber vegetable product. The amount of the total dietary fiber may be 30 to 90%, 35 to 90%, 40 to 90%, 45 to 90%, 50 to 90%, 55 to 90%, 60 to 90% 65 to 90%, 70 to 90%, 75 to 90%, 80 to 90%, 85 to 90%, or 90% (w/w) (or any integer value in any of these ranges) of the high fiber vegetable product. The amount of mono- and disaccharides may be 1 to 10% (w/w) of the high fiber vegetable product. The amount of mono- and disaccharides may be 1 to 10%, 2 to 10%, 3 to 10%, 4 to 10%, 5 to 10%, 6 to 10%, 7 to 10%, 8 to 10%, 9 to 10%, or 10% (w/w) (or any integer value in any of these ranges) of the high fiber vegetable product. The amount of inulin may be 30 to 75% (w/w) of the high fiber vegetable product. The amount of inulin may be 30 to 75%, 35 to 75%, 40 to 75%, 45 to 75%, 50 to 75%, 55 to 75%, 60 to 75%, 65 to 75%, 70 to 75%, or 75% (w/w) (or any integer value in any of these ranges) of the high fiber vegetable product. The amount of soluble fiber other than inulin may be 1 to 10% (w/w) of the high fiber vegetable product. The amount of soluble fiber other than inulin may be 1 to 10%, 2 to 10%, 3 to 10%, 4 to 10%, 5 to 10%, 6 to 10%, 7 to 10%, 8 to 10%, 9 to 10% or 10% (w/w) (or any integer value in any of these ranges) of the high fiber vegetable product. The amount of insoluble fiber may be 1 to 10% (w/w) of the high fiber vegetable product. The amount of insoluble fiber may be 1 to 10%, 2 to 10%, 3 to 10%, 4 to 10%, 5 to 10%, 6 to 10%, 7 to 10%, 8 to 10%, 9 to 10%, or 10% (w/w) (or any integer value in any of these ranges) of the high fiber vegetable product. The soluble fiber other than inulin may be but is not limited to at least one of pectin, and hemicellulose. The insoluble fiber be but is not limited to at least one of cellulose, lignin, and hemicellulose. The high fiber vegetable product may further include protein. The amount of protein may be 1 to 9% (w/w)) of the high fiber vegetable product. The amount of protein may be 1 to 9%, 2 to 9%, 3 to 9%, 4 to 9%, 5 to 9%, 6 to 9%, 7 to 9%, 8 to 9%, or 9% (w/w) (or any integer value in any of these ranges) of the high fiber vegetable product. The protein may be free or substantially free of gluten. The high fiber vegetable product may be in a processed form. The processed form may be fiber rich powder, inulin rich powder, oligofructose rich syrup, granules, or filter cakes. The processed form may be the end product (other than side streams or vegetable slices) of any methods herein.

In an embodiment, the total dietary fiber may be derived from any one of the plants described herein.

In an embodiment, a high fiber vegetable product is provided that may a total dietary fiber (TDF). The total dietary fiber may include inulin, soluble fiber other than inulin and insoluble fiber. The amount of the total dietary fiber may be 30 to 90% (w/w) of the high fiber vegetable product. The amount of the total dietary fiber may be 30 to 90%, 35 to 90%, 40 to 90%, 45 to 90%, 50 to 90%, 55 to 90%, 60 to 90%, 65 to 90%, 70 to 90%, 75 to 90%, 80 to 90%, 85 to 90%, or 90% (w/w) (or any integer value in any of these ranges) of the high fiber vegetable product. The amount of inulin may be 60 to 75% (w/w) of the high fiber vegetable product. The amount of inulin may be 60 to 75%, 61 to 75%, 62, to 75%, 63 to 75%, 64 to 75%, 65 to 75%, 66 to 75%, 67 to 75%, 68 to 75%, 69 to 75%, 70 to 75%, 71 to 75%, 72 to 75%, 73 to 75%, 74 to 75%, or 75% (w/w) (or any integer value in any of these ranges) of the high fiber vegetable product. The amount of soluble fiber other than inulin may be 1 to 10% (w/w) of the high fiber vegetable product. The amount of soluble fiber other than inulin may be 1 to 10%, 2 to 10%, 3 to 10%, 4 to 10%, 5 to 10%, 6 to 10%, 7 to 10%, 8 to 10%, 9 to 10% or 10% (w/w) (or any integer value in any of these ranges) of the high fiber vegetable product. The amount of insoluble fiber may be 1 to 10% (w/w) of the high fiber vegetable product. The amount of insoluble fiber may be 1 to 10%, 2 to 10%, 3 to 10%, 4 to 10%, 5 to 10%, 6 to 10%, 7 to 10%, 8 to 10%, 9 to 10% or 10% (w/w) (or any integer value in any of these ranges) of the high fiber vegetable product. The soluble fiber may include at least one of pectin, and hemicellulose. The high fiber vegetable product may have "emulsifying properties" due to its pectin fraction. The insoluble fiber may include at least one of cellulose, lignin, and hemicellulose. The high fiber vegetable product may further include mono- and disaccharides. The amount of mono- and disaccharides may be 1 to 10%, 2 to 10%, 3 to 10%, 4 to 10%, 5 to 10%, 6 to 10%, 7 to 10%, 8 to 10%, 9 to 10%, or 10% (w/w) (or any integer value in any of these ranges) of the high fiber vegetable product. The high-fiber vegetable product may further include protein. The amount of protein may be 1 to 9%, 2 to 9%, 3 to 9%, 4 to 9%, 5 to 9%, 6 to 9%, 7 to 9%, 8 to 9%, or 9% (w/w) (or any integer value in any of these ranges) of the high fiber vegetable product. The protein may be free or substantially free of gluten. The total dietary fiber may be derived from any plant described herein. The high fiber vegetable product may be in a processed form. The processed form may be fiber rich powder, inulin rich powder, oligofructose rich syrup, granules, or filter cakes. The processed form may be the end product (other than side streams or vegetable slices) of any methods herein.

The high fiber vegetable product may include potassium. Potassium may be present in the amount of 1.5-2% (w/w) (or any integer value therebetween, or in a range between any two integer values therebetween) of the high fiber vegetable product.

In an embodiment, a food product that includes any one of the high fiber vegetable products described herein is provided. The high fiber vegetable product may include inulin in the amount of 75% (w/w) of the high fiber vegetable product, pectin in the amount of 7% (w/w) of the high fiber vegetable product, and hemicellulose in the amount of 3% (w/w) of the high fiber vegetable product. The high fiber vegetable product may include potassium in the amount of 1.5-2% (w/w) (or any integer value therebetween, or in a range between any two integer values therebetween) of the high fiber vegetable product. The food product that includes the high fiber vegetable product may have prebiotic/bifidogenic properties. The food product may include 2.5 g dietary fiber of the high fiber vegetable product per serving and may be a "good source of fiber." The food product may include 5 g of dietary fiber of the high fiber vegetable product and may be an "excellent source of fiber."

The high fiber vegetable product may substitute at least a portion of flour found in ordinary food stuff. The high fiber vegetable product may substitute 15% of the flour. The food stuff may be any food stuff. The food stuff may be any food stuff that includes flour. The food stuff may be but is not limited to bread, bread rolls white, bread rolls wheat-white, hamburger buns, tortillas white, tortillas wheat, hot cereal, ready-to-eat (RTE) cereal, nutritional bars, cereal bars, cookies, cakes, pasta, fried tortilla chips, baked tortilla chips, pizza, muffins, or brownies. The food stuff may be cereal, nutritional bars, bread or brownies. The food stuff may be animal feed.

In an embodiment, the flour substitute including the high-fiber vegetable product may further include protein and potassium. Any of the food products described herein may include flour and the flour substitute at a ratio 85:15.

In an embodiment, a composition including a product of any method herein is provided. The composition may further include a food or animal feed ingredient. The composition may include flour. The composition may include the components of a food or animal feed.

Processes for Obtaining High Fiber Vegetable Product (VP)

Figure 2:
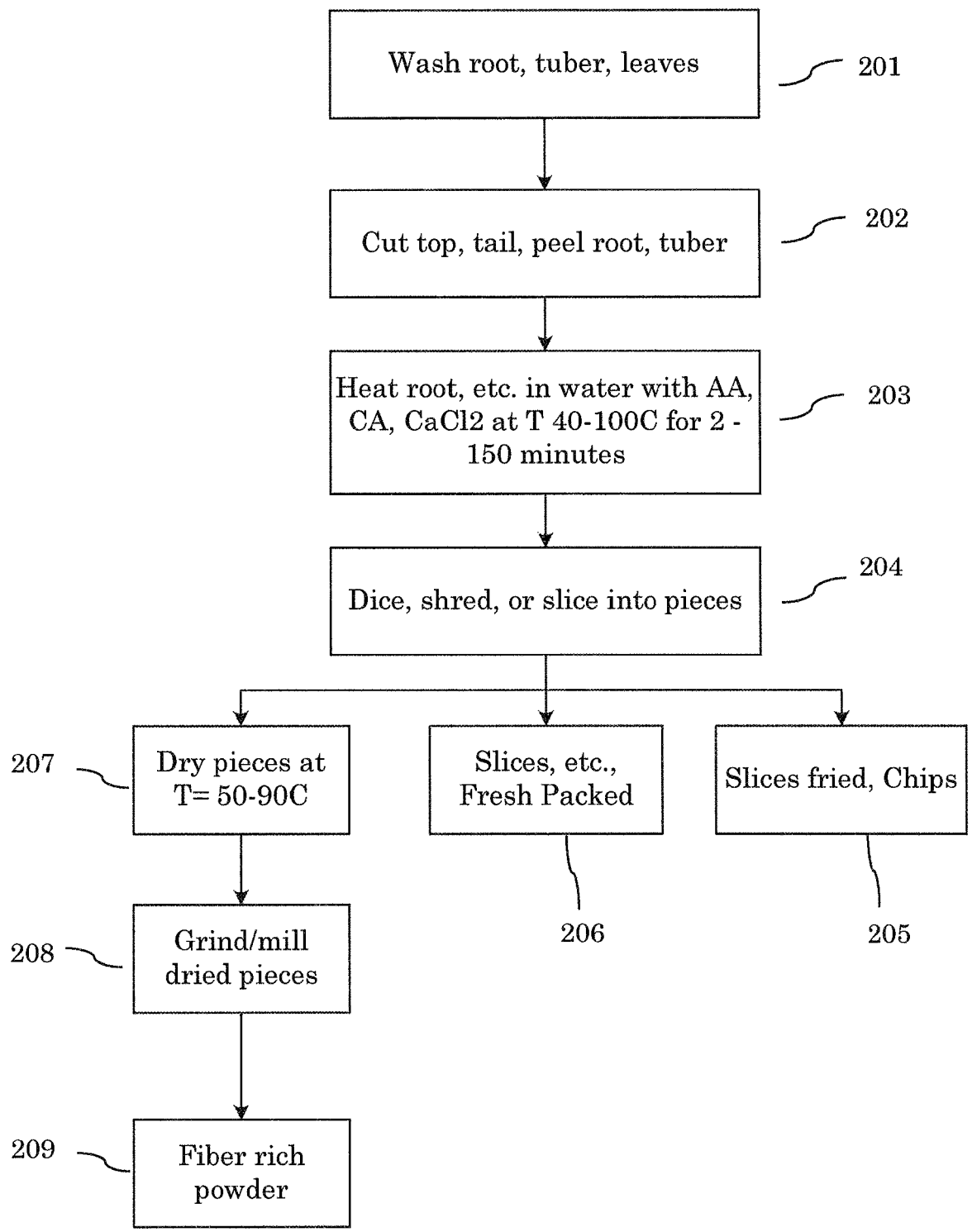
FIG. 2 illustrates an embodiment of a method of manufacturing high fiber vegetable product.

Referring to FIG. 2, a method of manufacturing high fiber vegetable products is illustrated (Process I). The method may include washing vegetable matter in washing step 201. The vegetable matter may be heated in step 202. The method may include cutting and peeling the vegetable matter in step 202. The vegetable matter may be heated in water in step 203. The water may include ascorbic acid (AA), citric acid (CA) and $CaCl_2$. A water temperature may be at 40° C. to 100° C. (or any integer value therebetween, or in a range between any two integer values therebetween). For example, heating may be at 48° C. to 60° C., or 48° C. Heating may be at 45° C. The vegetable matter may be heated for 2 to 150 minutes (or any integer value therebetween, or in a range between any two integer values therebetween). The vegetable matter may be treated to proactively de-bitter, while retaining macro/micro nutrients. The method may include dicing, shredding or slicing the vegetable matter into pieces in step 204. The vegetable matter may be at least one of the root, tuber, leaf, or other part of a plant. The plant may be from the Asteraceae family. The plant may be Belgian endive, endive, globe artichoke, chicory, Jerusalem artichoke, salsify, dandelion, or dahlia, burdock, and yacon. The vegetable matter may include matter from more than one species or more than one part of a plant. Other plants or plant parts from the Asteraceae family may be a source of vegetable matter. Vegetable product may be derived from any of these examples of vegetable matter. Any method herein may be performed with vegetable matter as here described. The at least one of AA, CA, and $CaCl_2$ may contribute to inactivating and/or inhibiting bitter and color component production. The skilled artisan will recognize agents that could substitute for or be added to the at least one of AA, CA, or $CaCl_2$. One or more of EA (erythorbic acid), EDTA (ethylenediamene tetraacetic acid), cysteine, cyclodextrin, 4 hexylresorcinol, proteases, Ca-gluconate, Ca-lactate and Ca-lactategluconate are non-limiting examples of agents that can be added to or are substitutes for the AA, CA, or $CaCl_2$. The concentration of each of the AA, CA, or $CaCl_2$ or their additives or substitutes may be 0.01-2% (w/w). The concentration may be an 0.01 increment value from 0.01-2%. The concentration may be in a range between any two 0.01 increments from 0.01-2%. The method may include heating the vegetable matter at 40-100° C. After the above steps, the product may be treated in at least three different ways. The treated vegetable matter may be sliced, and the slices may be fried to produce chips in step 205. The treated vegetable matter may be sliced and fresh packaged in step 206. Alternatively, the treated vegetable matter may be dried in step 207, e.g., at 50-90° C., and subjected to grinding and/or milling in step 208 to produce a fiber rich powder in step 209. The fresh packaged material may take any form, including but not limited to being diced, shredded, or sliced. The fresh packaged material may be cold stored. As a further alternative, the treated vegetable matter may be fried or otherwise cooked. Fried slices may be or be presented as chips. The process illustrated in FIG. 2 may reduce bitter components in the final product by inhibiting secondary metabolite production, occurring after wounding, by inhibiting enzymes prior to the peeling, dicing, shredding, or slicing of the vegetable matter. The enzyme inhibition may occur through the step of heating the vegetable matter in water that may include at least one of AA, CA, and $CaCl_2$.

Figure 3:
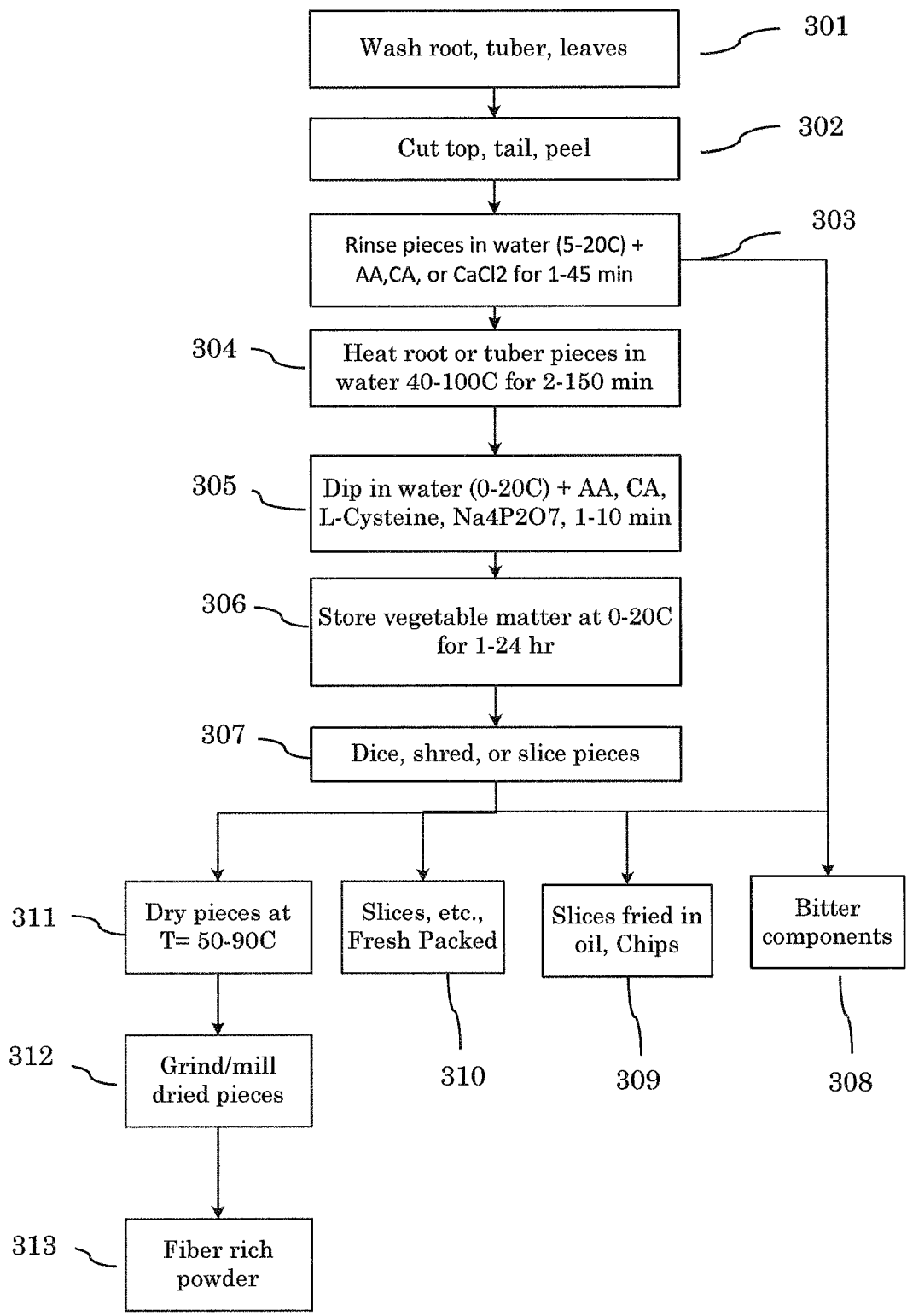
FIG. 3 illustrates an embodiment of a method of manufacturing high fiber vegetable product.

Referring to FIG. 3, a method of manufacturing high fiber vegetable products is illustrated (Process II). The method may include washing the vegetable matter step 301. The method may include cutting the top and tail of the vegetable matter off in step 302. The method may include waiting 60-500 seconds (or any integer value therebetween, or in a range between any two integer values therebetween), and rinsing cut pieces in water at 0-20° C. (or any integer value therebetween, or in a range between any two integer values therebetween). In step 303. The rinse water may include at least one of AA, CA, or $CaCl_2$ (or suitable additives or substitutes). The concentrations of AA, CA, or $CaCl_2$, additive or substitutes may be as listed above. The rinse water may be collected as a side stream including bitter components, as indicated by the vertical arrow bypassing steps 304-307 into step 308. The method may include heating the vegetable matter in water at 40-100° C. for 2-150 min (or any integer value of temperature or time therebetween, or in a range between any two integer values therebetween) in step 305. For example, heating may be at 48° C. to 60° C., or 48° C. Heating may be at 45° C. After heating, the method may include dipping the vegetable matter in water at 0-20° C. for 1-10 minutes (or any integer value of temperature or time therebetween, or in a range between any two integer values therebetween) in step 305. The dipping water may include at least one of AA, CA, L-cysteine, or $Na_4P_2O_7$ (or suitable additives or substitutes). The method may optionally include storing the vegetable matter at 0-20° C. (or any integer of temperature therebetween, or in a range between any two integer values therebetween) for 1-24 hours (or any integer value of temperature or time therebetween, or in a range between any two integer values therebetween) in step 306. After heating or storing, the vegetable matter may be subjected to dicing, shredding, slicing, or any other suitable sizing/shaping process in step 307. After the above steps, the product may be treated in at least four different ways, as represented by the arrows leaving the vertical process stream and leading to steps 308, 309, 310 and 311. The treated vegetable matter may be dried in step 311; e.g., at 50-90° C., and subjected to grinding and/or milling in step 312 to produce a fiber rich powder in step 313. Alternatively, the treated vegetable matter may be fresh packaged in step 310. The fresh packaged material may take any form, including but not limited to being diced, shredded, or sliced. As a further alternative, the treated vegetable matter may be fried or otherwise cooked in step 309. Fried slices may be presented as chips. Bitter components may be collected in step 308. The process illustrated in FIG. 3 may reduce bitter components by removing them in the waiting or rinsing steps and/or by inhibiting secondary metabolite production, occurring after wounding, by inhibiting enzymes. The enzyme inhibition may occur through the step of heating the vegetable matter.

Figure 4:
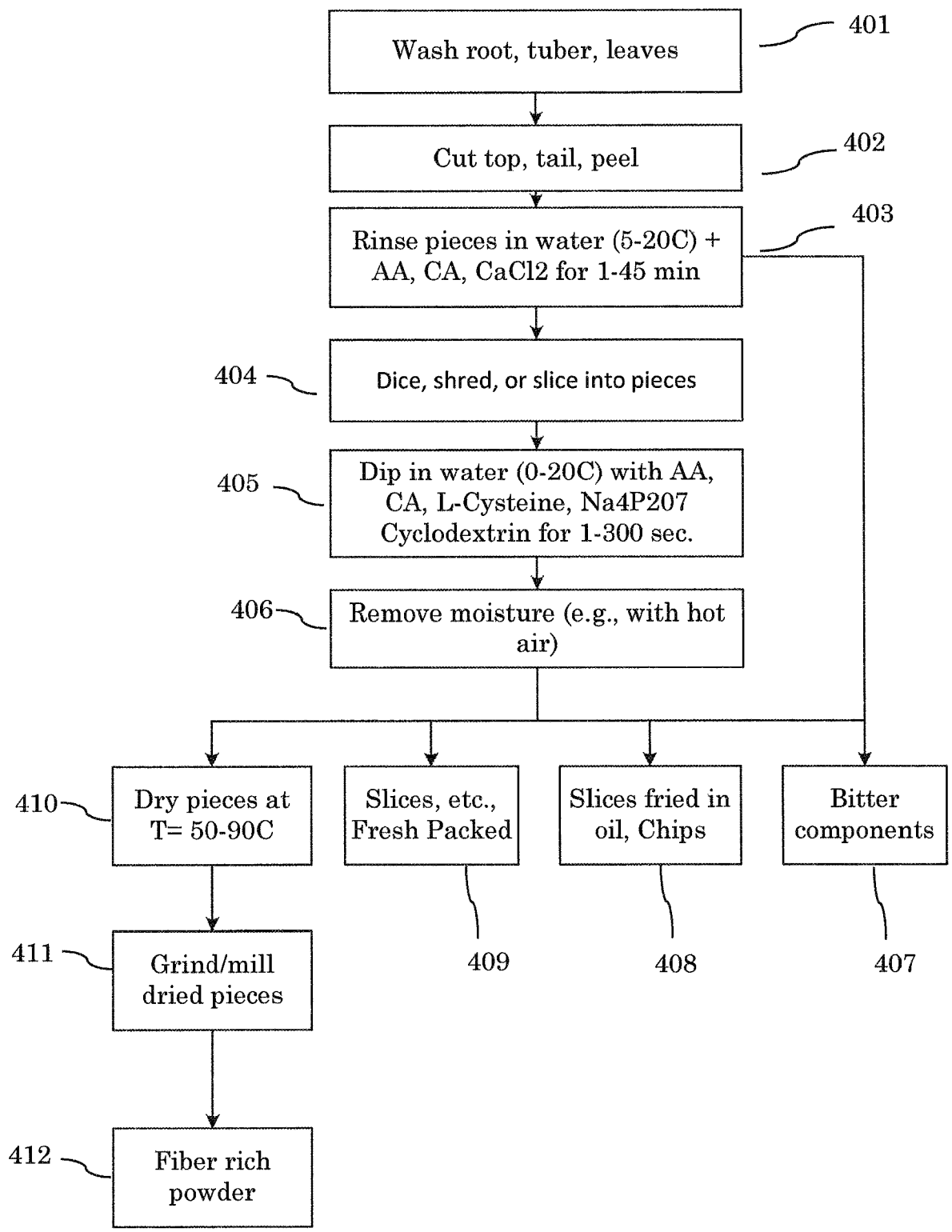
FIG. 4 illustrates an embodiment of a method of manufacturing high fiber vegetable product.

Referring to FIG. 4, a method of manufacturing high fiber vegetable products is illustrated (Process III). The method may include one or more of washing the vegetable matter in step 401, cutting the top and tail of the vegetable matter off in step 402, waiting 1-45 minutes, and rinsing cuts in water at 5-20° C. in step 403. The rinse water may include at least one of AA, CA, or $CaCl_2$ (or suitable substitutes). The concentrations of AA, CA, or $CaCl_2$ may be as listed above. The rinse water may be collected in step 407 as a side stream including bitter components, as indicated by the vertical arrow bypassing steps 404, 405, and 406 and leading to step 407. The method may include dicing, shredding, slicing, or otherwise sizing and shaping the vegetable matter in step 404. The method may also include dipping the sized and shaped vegetable matter in water (at 0-20° C. (or any integer value therebetween or in a range between any two integers therebetween)) in step 405. The water may include at least one of AA, CA, L-cysteine or $Na_4P_2O_7$. The AA or CA may be added to or substituted with agents as described above with respect to the AA, CA, and $CaCl_2$ of prior embodiments. The concentration of AA or CA and the additive and/or substitutes may be as set forth above. The concentration $Na_4P_2O_7$ may be 0.1 to 1% (m/v). The $Na_4P_2O_7$ concentration may be a 0.1 increment value from 0.1-1%. The $Na_4P_2O_7$ concentration may be in a range between any two 0.1 increments from 0.1-1%. Dipping may last 10-120 seconds (or any integer value therebetween, or in a range between any two integer values therebetween). The method may include removing moisture from the vegetable matter in step 406. Removing moisture may include passing dry air around and/or through the vegetable matter. After the above steps, the product may be treated in at least four different ways, as represented by the arrows leaving the vertical process stream and leading to steps 407, 408, 409 and 410. The treated vegetable matter may be dried in step 410; e.g., at 50-90° C. (or any integer value therebetween, or in a range between any two integer values therebetween), and subjected to grinding and/or milling in step 411 to produce a fiber rich powder in step 412. Alternatively, the treated vegetable matter may be fresh packaged in step 409. The fresh packaged material may take any form, including but not limited to being diced, shredded, or sliced. As a further alternative, the treated vegetable matter may be fried or otherwise cooked in step 408. Fried slices may be presented as chips. Bitter components may be collected in step 407. The process illustrated in FIG. 4 may reduce bitter components by removing them in the waiting or rinsing steps and/or by inhibiting secondary metabolite production, occurring after wounding, by inhibiting enzymes. The enzyme inhibition may occur through the steps of spraying and/or removing moisture.

Figure 5:
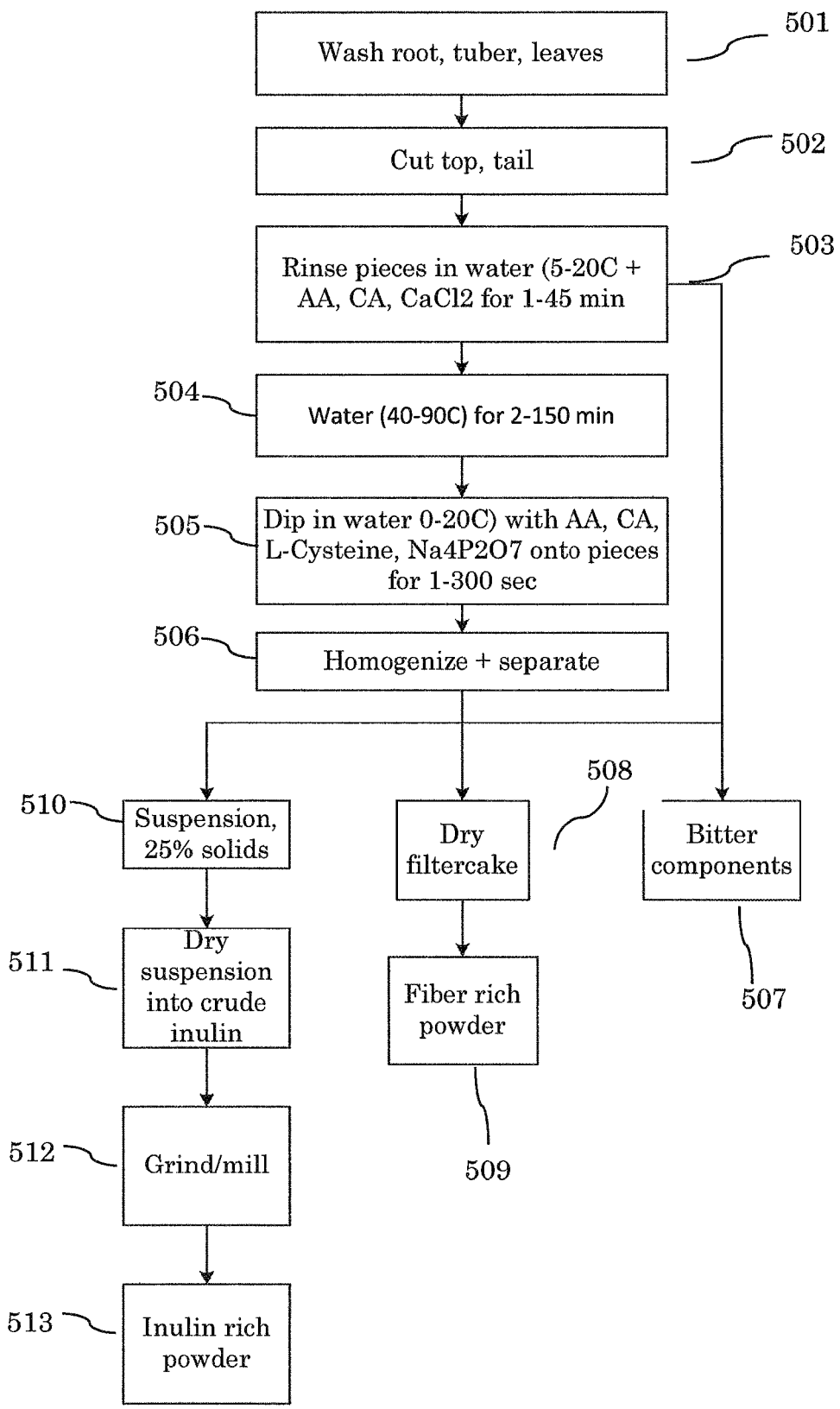
FIG. 5 illustrates an embodiment of a method of manufacturing high fiber vegetable product.

Referring to FIG. 5, a method of manufacturing high fiber vegetable products is illustrated (Process IV). The method may include one or more of washing the vegetable matter in step 501, cutting the top and tail of the vegetable matter off in step 502, waiting 1-45 minutes, and rinsing cuts in water at 5-20° C. (or any integer value therebetween, or in a range between any two integer values therebetween) in step 503. The rinse water may include at least one of AA, CA, or $CaCl_2$ (or suitable substitutes). The concentrations of AA, CA, or $CaCl_2$ may be as listed above. The rinse water may be collected in step 507 as a side stream including bitter components, as indicated by the vertical arrow bypassing steps 504, 505, and 506 and leading to step 507. The method may include additional rinsing the vegetable matter in water at 40-90° C. (or any integer value therebetween or in a range between any two integers therebetween) for 2-150 minutes (or any integer value therebetween or in a range between any two integers therebetween) in step 504. The method may also include dipping the rinsed vegetable matter in water (at 0-20° C. (or any integer value therebetween or in a range between any two integers therebetween)) in step 505. The water may include at least one of AA, CA, L-cysteine or $Na_4P_2O_7$. The AA or CA may be added to or substituted with agents as described above with respect to the AA, CA, and $CaCl_2$ of prior embodiments. The concentration of AA or CA and the additive and/or substitutes may be as set forth above. The concentration $Na_4P_2O_7$ may be 0.1 to 1% (m/v). The $Na_4P_2O_7$ concentration may be a 0.1 increment value from 0.1-1%. The $Na_4P_2O_7$ concentration may be in a range between any two 0.1 increments from 0.1-1%. Dipping may last 1-300 seconds (or any integer value therebetween, or in a range between any two integer values therebetween). After dipping, the method may include homogenizing or separating components in step 506. The method may be split into three alternatives in steps 507, 508 and 510. In step 510, a suspension produced in the prior step has 25% (weight/weight) solids and the method may include drying the suspension to produce crude inulin in step 511, then grinding and/or milling the crude inulin in step 512 to produce an inulin rich powder in step 513. In step 508, the stream subjected to homogenization/separation yields a solid, which can be processed to provide a dry filter cake, which may be processed into a fiber rich powder in step 509. Bitter component may be collected in step 507.

Figure 6:
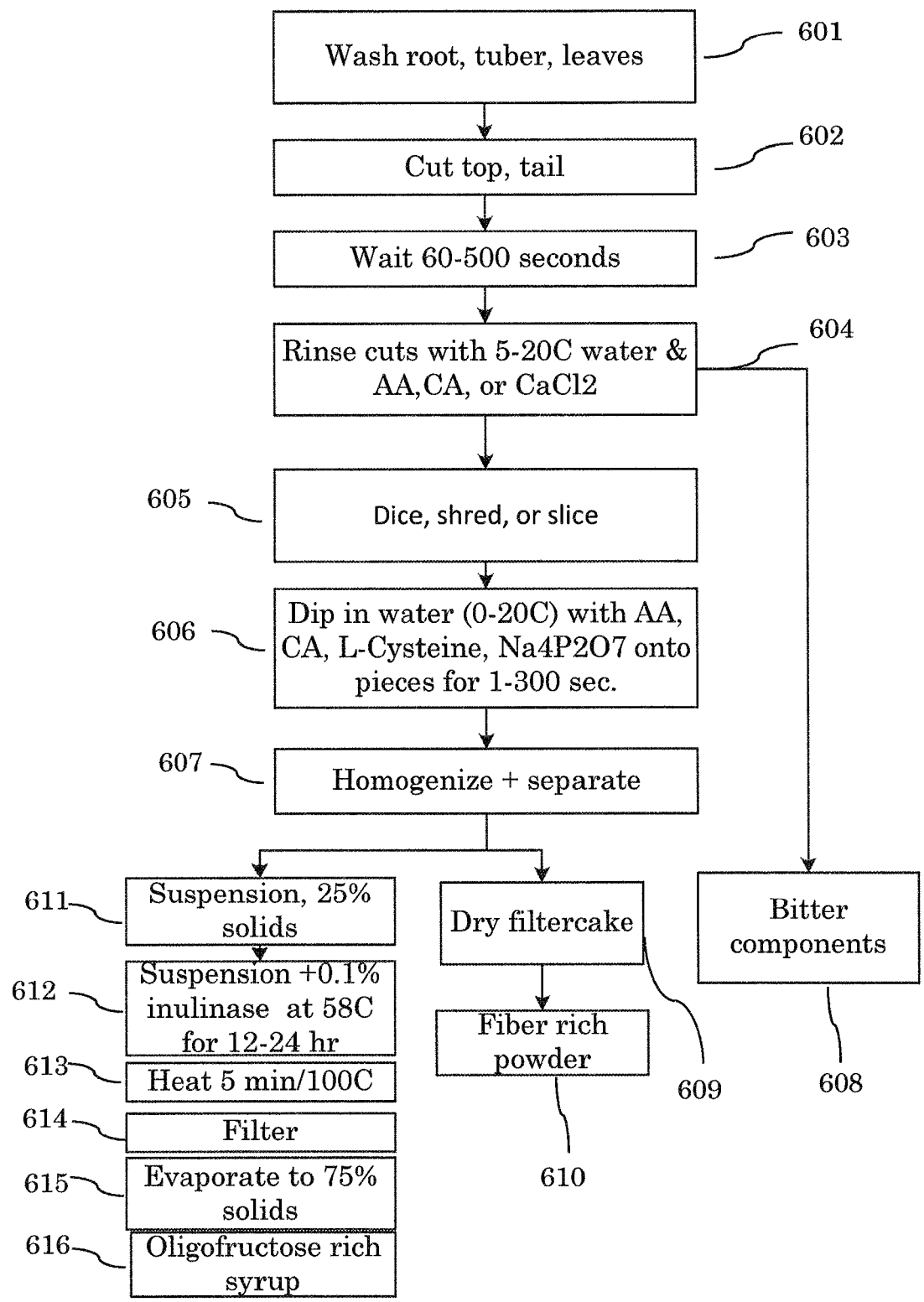
FIG. 6 illustrates an embodiment of a method of manufacturing high fiber vegetable product.

Referring to FIG. 6, a method of manufacturing high fiber vegetable products is illustrated (Process V). The method may include one or more of washing the vegetable matter in step 601, cutting the top and tail of the vegetable matter off in step 602, waiting 60-500 seconds in step 603, and rinsing cuts in water at 5-20° C. in step 604. The rinse water may include at least one of AA, CA, or $CaCl_2$ (or suitable substitutes). The concentrations of AA, CA, or $CaCl_2$ may be as listed above. The rinse water may be collected in step 608 as a side stream including bitter components, as indicated by the vertical arrow bypassing steps 605, 606, and 607 and leading to step 608. The method may include dicing, shredding, slicing, or otherwise sizing and shaping the vegetable matter in step 605. The method may also include dipping the sized and shaped vegetable matter in water (at 0-20° C. (or any integer value therebetween or in a range between any two integers therebetween)) in step 606. The water may include at least one of AA, CA, L-cysteine or $Na_4P_2O_7$. The AA or CA may be added to or substituted with agents as described above with respect to the AA, CA, and $CaCl_2$ of prior embodiments. The concentration of AA or CA and the additive and/or substitutes may be as set forth above. The concentration $Na_4P_2O_7$ may be 0.1 to 1% (m/v). The $Na_4P_2O_7$ concentration may be a 0.1 increment value from 0.1-1%. The $Na_4P_2O_7$ concentration may be in a range between any two 0.1 increments from 0.1-1%. Dipping may last 1-300 seconds (or any integer value therebetween, or in a range between any two integer values therebetween). After dipping, the method may include homogenizing and separating components in step 607. The method may be split into alternatives in steps 609 and 611. In step 611, a suspension produced in the prior step may have 25% (weight/weight) solids and the method may include adding an inulinase, for example, endo-inulinase [EC 3.2.1.7] to the suspension in step 612. The concentration of inulinase in the suspension may be 0.1-0.3% (or any 0.01 increment from 0.1 to 0.3%, or in a range between any two 0.01 increments from 0.1-0.3%). The pH may be at 4.5-6.0 and the temperature may be at 55-60 C. The method may include heating the suspension in step 613 after the enzymatic hydrolysis in order to inactivate the inulinase and to coagulate the proteins. The heating time may be 5-10 minutes, and the temperature may be 90-100° C. (or any integer value between). The method may also include filtering the solution in step 614, and evaporating the suspension to reach 75% (weight/weigh) solids in step 615. The evaporated, 75% solids product results into an oligofructose (DP 3-9) rich syrup in step 616. Under alternative, in step 609, the stream subjected to homogenization/separation yields a solid material, which can be processed to provide a dry filter cake, which may be processed into a fiber rich powder in step 610. Bitter components may be collected in step 608.

Figure 7:
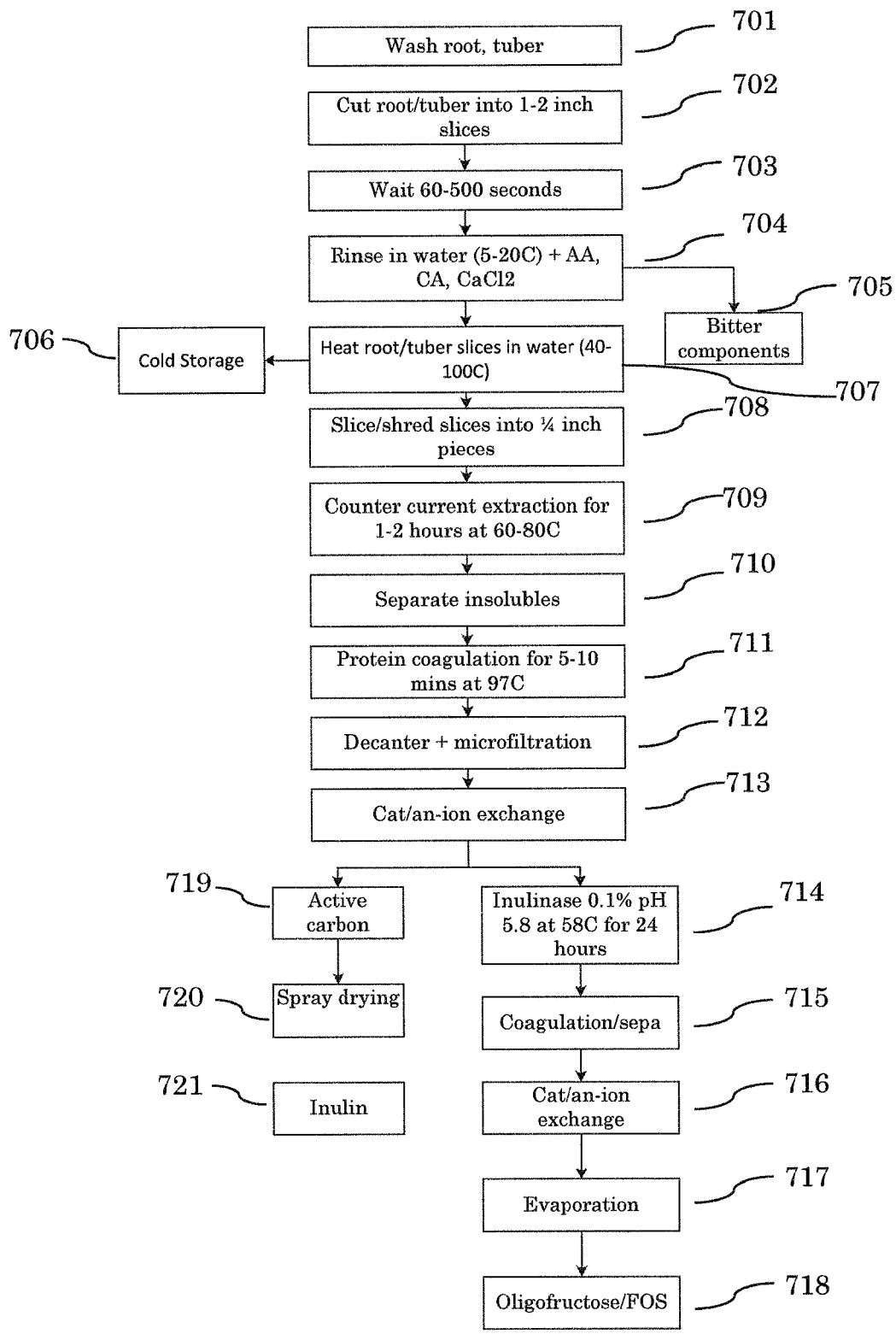
FIG. 7 illustrates an embodiment of a method of manufacturing high fiber vegetable product.

Referring to FIGS. 7, a method of manufacturing high fiber vegetable products is illustrated (Process VI). The method may include steps of washing vegetable matter (e.g., root, tuber, etc.) in step 701, cutting the root tuber into slices (e.g., 1-2 inch slices) in step 702, waiting 60-500 seconds (or any integer value therebetween, or in a range between any two integer values therebetween) in step 703, and then rinsing the slices in water in step 704. The water may be at a temperature as described above for rinsing, and contain at least one of AA, CA, or $CaCl_2$. The concentration of AA, CA, or $CaCl_2$ may be as described above. Also, as described above, the rinse water may be collected in step 704 as a side stream to provide a source of bitters. The method may also include heating the vegetable matter at 40-100° C. (or any integer value therebetween, or in a range between any two integer values therebetween) for a time of 2-150 min (or any integer value therebetween, or in a range between any two integer values therebetween). For example, heating may be at 48° C. to 60° C., or 48° C. Heating may be at 45° C. After the heating step, the vegetable matter may be diverted to cold storage in step 706 to re-enter the process later, or continued through the method. The method may also include counter current extraction of the vegetable matter after the heating and/or cold storage steps. The method may include slicing the vegetable matter in step 707 and then shredding slices into ¼ inch pieces. The counter current extraction may occur for 1-2 hours (or any value therebetween, or in a range between any two minute values therebetween) at a temperature of 60-80° C. (or any integer value therebetween, or in a range between any two integer values therebetween) in step 708. The method may also include separating insolubles from the mixture in step 710, coagulating proteins (e.g., but not limited to, by subjecting the mixture to 90-100° C. for 5-10 minutes) in step 711, decanting and/or microfiltration of the mixture in step 712, and subjecting the mixture to cation and/or anion exchange in step 713. At each point of separating insoluble, coagulating proteins, and decanting/microfiltration, side streams may be harvested or may be subjected to disposal/remediation. After subjecting the mixture to cat/an-ion exchange, the mixture can be subjected to alternative processes in steps 714 and 719. In step 719, the method includes passing the mixture over or through activated carbon, and spraying and drying the mixture in step 720 to produce inulin in step 721. In step 714, the mixture is subjected to an enzymatic hydrolysis using inulinase, a second coagulation and separation step in step 714, a second cat/an-ion exchange step in step 716, and evaporation in step 717 to yield oligofructose/FOS in step 718.

An embodiment includes the product of any method herein. An embodiment includes the product of any method herein, wherein the method is terminated at any one step described herein. An embodiment incudes the product of any side stream of a method herein. An embodiment includes any product herein incorporated in a food.

Generally, embodiments herein provide methods to process crops with high levels of fibers into high fiber vegetable products (VP), to be used as ingredients in processed food or as foods for human and animal consumption. The crops include selected crops from Asteraceae family, with some exceptions. Features of these methods may include: a) retention of the maximum amount of nutritive and functional fibers and other essential nutrients (proteins, minerals, vitamins); b) eliminating negative perceived flavors and colors in these plant materials, in order to avoid palatability issues. Vegetables are processed in a fashion that the flavor and color components are either removed, prevented to be formed, or combinations of these treatments. Several routes are described using these principles, resulting in white to cream colored powders or vegetable pieces consisting of mostly dietary fibers, protein and minerals.

Applications including any high fiber vegetable product herein (VP) in food. VP powder may substitute refined (white) flour from grains (e.g., from wheat, corn, rice, oat and barley, and combinations), legumes (e.g., soy, pulses) and starchy root and tubers (e.g., potato, tapioca, sweet potatoes), with approximately equivalent quantities on weight basis, in a variety of processed foods. At a level of 5-15% substitution, based on the total existing flour component, a nutritional claim for 'good' (2.5 gram fiber/serving) or 'excellent' (5 gram fiber/serving) source of fiber can be made (FDA; CFR title 21). These fiber-rich food products result in eating qualities (taste and textural properties) comparable with the 100% refined grain, legumes or starchy root/tuber based flour formulations. The partial VP substitution improves the general nutritional and health profile of said products: prebiotic/bifidogenic properties due to high fructan or inulin content of VP; lowering Na-salt content, adding K-salts; lowering gluten content, adding vegetable protein. Examples of food products suitable to apply this concept include but are not limited to: bread, bun, muffin, brownie, biscuit, doughnut, cookies, cracker, taco, tortilla, waffle, chips, pasta, pizza crust, pretzel, noodles, RTE cereals and nutritional bars, etc. embodiments include food products, including but not limited to any of the foregoing, having any high fiber vegetable product herein as a portion of the food product.

VP powder may substitute 5-15%, in approximately equivalent quantities based on the flour component. The flour may be 'Whole Grain' Flour or White Flour. Flour blended with VP may improve the nutritional profile from flour-based products. VP may fill the 'Fiber-gap' in 'whole grain' containing processed food to the level of 'good' or 'excellent' source. VP also makes it easier to process these 'whole flour' blends and improve the eating qualities of the subsequent food products for a range of food. Addition of VP powder to a range of other food products: e.g., but not limited to, soup, sauces, batter, dairy baking mix, meat extender, baby food, animal food, pet food etc., may be desirable and is provided in embodiments herein in order to increase the nutritional and health profile (prebiotic/bifidogenic, etc.). It may elevate the fiber content in these food products to a 'good' or 'excellent' source of fiber.

In an embodiment, treated root and tuber pieces can be offered as fiber-rich vegetable bite. Treated root and tuber pieces may be further processed (slicing and frying or baking) into fiber-rich vegetable chips.

VP may contain virtually all plant fractions from the crop: fructan/inulin fiber, other fibers (pectin, hemi-cellulose, cellulose), proteins, minerals and vitamins. Approximately 40-75% of the dry matter of VP may be fructan, depending on the plant source and part. Besides the nutritional and health features of fructan (prebiotic/bifidogenic fiber), VP provides fibers with additional health attributes (pectin: cholesterol lowering, antibacterial; cellulose/hemicellulose: regularity) and high levels of Potassium. The process to manufacture VP requires moderate amounts of capital investments, uses few process aids, consumes low amount of energy and creates substantially fewer side streams than pre-existing methods.

Products processed according to embodiments herein may overcome negative flavor attributes in prior fructan-rich vegetable products, including baby food, and may be used in baby food products.

Products of embodiments herein may be added in concentrations of 5-15% relative to the flour component in a food, in order to make nutritional claim for 'good' or 'excellent' source of fiber and may be without off-color or negative aftertaste.

Products of embodiments herein may be processed 'as whole' and may not require use of UV or strong alkaline conditions.

Products of embodiments herein may have superior powder properties (<5% sugars; >65% has DP>5) and may be less hygroscopic compared to products processed in more steps at higher temperature, including spray drying.

Products of embodiments herein may have a white color and be bland in taste. Products of embodiments herein may be included in a food or animal feed composition. An embodiment includes a composition including a product herein and optionally another food or animal feed ingredient. For example, a composition may include a product herein and flour.

In an embodiment, products are provided. The products include but are not limited to: 1) VP fiber-rich powders; 2) VP slices; 3) VP slices, fried; 4) bitter components, 5) inulin rich powder, 6) oligofructose rich syrup, 7) inulin powder, 8) oligofructose, syrup/powder; and 9) 'treated' whole root or tuber (e.g., by process VI) that can be stored at 0-10° C. for several weeks before further processed into inulin or oligofructose.

In an embodiment, products may be provided in applications including but not limited to: 1) food ingredients; 2) foods; 3) dietary supplements; 4) feed/pet food; 5) pharma (bitter components, sesquiterpene lactones).

In an embodiment, products may provide Health & Nutrition applications.

In an embodiment, products herein may be or be part of compositions including VP powders. The VP powders may provide 1) a fiber source (80-85% of VP) a) prebiotic (food/feed/petfood); b) reduction in calorie intake (satiety); c) regularity (normal frequency stool); 2) a protein source (1-9% of VP); 3) a potassium source (~1500 mg/100 g VP); a partially replacement for salt (NaCl) in all applications where VP replaces flour in food.

FIGS. 2-7 illustrate exemplary methods as Processes I-VI, respectively. The methods may be altered within parameters known to the skilled artisan.

Further embodiments herein may be formed by supplementing an embodiment with one or more element from any one or more other embodiment herein, and/or substituting one or more element from one embodiment with one or more element from one or more other embodiment herein.

EXAMPLES

The following non-limiting examples are provided to illustrate particular embodiments. The embodiments throughout may be supplemented with one or more detail from one or more example below, and/or one or more element from an embodiment may be substituted with one or more detail from one or more example below.

Example 1. Processing Whole Vegetables

Chicory plants were processed using Processes I, II and III described herein. Twenty five samples were selected from more than 100 trials. Samples labeled WF01, WF02, WF03A, WF03B, WF03C, WF04, WF05, WF06, WF07, WF08, WF09, WF10, WF11, WF12, WF13, WF14, WF15, WF16, WG17, WF18, WF19, WF20, WF21, WF22, WF23, WF24, WF25, and WF06 were analyzed by the HPLC-UV detection system for the presence of the following sesquiterpene lactones: dihydro lactucin glycoside, dihydro lactucin oxalate, lactucin glycoside, lactucin oxalate, dihydro lactucin, lactucin, deoxylactucin glycoside, dihydro deoxylactucin glycoside, deoxylactucin oxalate, dihydro deoxylactucin oxalate, deoxylactucin, dihydro deoxylactucin, lactucopricrin oxalate, dihydro lactucopricin oxalate, lactucopricrin, or dihydrolactucopricin. The sesquiterpene lactone (SL) readings (UV) were calibrated using SL lactucin and the concentrations of sesquiterpene lactones, expressed as lactucin, ppm were estimated for all samples. Samples were ranked based on the ppm concentration of total sesquiterpene lactones per sample of the high fiber vegetable product. The following conditions were tested: pretreatement with AA, CA and peeling; heating step: temperature and AA and CA concentrations; heating step: time (minutes) and pH; dipping step: concentrations of AA, L-cysteine and cyclodextrin (CD); dipping step: concentrations (%) of $Na_2HP_2O_7$ and $NaHSO_3$: drying temperature and concentration (%) of w/w liquid. Samples WF03A, WF03B, WF03 were not treated, and used as negative controls. Samples WF25 and WF06 that included inulin and bitter components collected Process II and III, respectively, were used as positive controls. A taste panel composed of five experts assessed bitterness of the samples using scale of 0-10 with 0 assigned to no bitterness and 10 assigned to extreme bitterness. Data from trials were summarized in Table 1.

TABLE 1

Overview trials eliminating bitter precursors and components in vegetable (Asteraceae).

| | Sesuiterpene Lactones (SL), ppm | | | | | | | | | | | | | |
|---|---|---|---|---|---|---|---|---|---|---|---|---|---|---|
| | WF 01 | WF 02 | WF 03A | WF 03B | WF 03C | WF 04 | WF 05 | WF 07 | WF 08 | WF 09 | WF 10 | WF 11 | WF 12 | WF 13 |
| Dihydro Lactucin Glycoside | 446 | 574 | 249.9 | 273.7 | 268.8 | 197 | 84.1 | 217 | 169 | 96.3 | 202 | 260 | 323 | 597 |
| Dihydro Lactucin Oxalate | 54.2 | 141 | 115.7 | 125.6 | 122.3 | 55.2 | 92.2 | 124 | 97.4 | 93.3 | 33 | 27 | 83.6 | 142 |
| Lactucin Glycoside | 3.96 | 3.87 | 66.43 | 69.46 | 68.33 | 9.02 | 4.95 | 10.4 | 5.99 | 3.86 | 9.6 | 4.77 | 5.14 | 4.61 |
| Lactucin Oxalate | 181 | 130 | 1551 | 1608 | 1584 | 373 | 432 | 601 | 445 | 411 | 106 | 69.8 | 721 | 155 |
| Dihydro Lactucin (dih lax) | 268 | 248 | 206.4 | 211.2 | 219 | 183 | 142 | 169 | 136 | 154 | 27 | 258 | 186 | 235 |
| Lactucin (lac) | 59.6 | 36.1 | 142.3 | 148.5 | 146.5 | 33.7 | 31.3 | 112 | 89.2 | 37.8 | 116 | 27.6 | 65.8 | 43.5 |
| Deoxylactucin Glycoside | 121 | 155 | 30.13 | 37.35 | 36.79 | 0 | 0 | 37.5 | 31.7 | 0 | 20 | 14.8 | 36.2 | 164 |
| Dihydro Deoxylactucin Glycoside | 2.07 | 6.84 | 5.128 | 2.823 | 2.675 | 12.6 | 2.73 | 2.04 | 0 | 2.81 | 9.5 | 6.21 | 5.74 | 8.78 |
| Deoxylactucin Oxalate | 74.7 | 102 | 779.3 | 802.7 | 790.8 | 137 | 93.5 | 299 | 172 | 84.5 | 65 | 5.16 | 231 | 120 |
| Dihydro Deoxylactucin Oxalate | 13.1 | 43.1 | 22.2 | 22.45 | 21.88 | 19.2 | 11.8 | 43 | 29.8 | 11.5 | 6.7 | 4.28 | 18.6 | 43.6 |
| Deoxylactucin (Dolax) | 34.9 | 29.3 | 51.53 | 52.47 | 51.69 | 14.7 | 9.56 | 63.5 | 39.2 | 9.28 | 66 | 4.85 | 23.3 | 34.7 |
| Dihydro Deoxylactucin (Dih dolac) | 50.2 | 89.7 | 57.34 | 57.87 | 59.94 | 45 | 25.9 | 55.3 | 38.6 | 27 | 6.8 | 26.5 | 40.3 | 85.9 |
| Lactucopricrin Oxalate + Dihydro Lactucopricin Oxalate | 135 | 97.3 | 1049 | 1093 | 1059 | 145 | 96.7 | 359 | 236 | 93 | 93 | 0 | 264 | 109 |
| Lactucopricrin (LCP) + Dihydro-lactucopricin (dih lcp) | 68.6 | 35.6 | 117.1 | 120 | 114.5 | 28.6 | 24.1 | 88.9 | 67.2 | 23.6 | 97 | 24.6 | 42.5 | 38.5 |
| Total Sesquiterpene Lactones (ppm) | 1513 | 1692 | 4443 | 4626 | 4546 | 1252 | 1051 | 2184 | 1557 | 1048 | 859 | 733 | 2046 | 1783 |
| Ranking conc SL | 17 | 19 | Ref | Ref | Ref | 14 | 13 | 22 | 18 | 12 | 10 | 9 | 21 | 20 |
| Residual SL % | 33 | 37 | 100 | | 100 | 27 | 23 | 47 | 34 | 23 | 18 | 16 | 44 | 39 |
| Bitterness (Taste Panel (5)); scale 0-10 0 = no bitterness avg. over >5 scores; rounded per 0.5 unit | 5.5 | 6 | 10 | 10 | 10 | 4 | 2.5 | 5.5 | 6 | 3.5 | 3 | 3 | 4 | 5.5 |
| Total: lac + lcp + dolax + dihlac, Dihlcp, dihdolax | 482 | 439 | 571 | 589 | 591 | 305 | 231 | 488 | 370 | 251 | 313 | 343 | 233 | 437 |
| Ranking conc SL | 19 | 18 | Ref | Ref | Ref | 13 | 9 | 20 | 16 | 10 | 14 | 15 | 11 | 17 |
| Process (I, II, III) | I | I | No treatment 03a/b/c* | | | I | I | I | I | II | II | II | II | I |
| Process conditions | | | | | | | | | | | | | | |
| pre-treatment AA %\|CA %\| peeling (y/n) | 0\|0\|n | 0\|0\|n | 0\|0\|n | 0\|0\|n | 0\|0\|n | 0\|0\|y | 0\|0\|y | 0\|0\|n | 0\|0\|n | .1\|0\|y | 0\|0\|n | .1\|.1\|y | .1\|.1\|n | 0\|n |

TABLE 1-continued

Overview trials eliminating bitter precursors and components in vegetable (Asteraceae).

| | | | | | | | | | | | | | | |
|---|---|---|---|---|---|---|---|---|---|---|---|---|---|---|
| heat step AA %\|CA %\| temp C. | .1\|0\|60 | .1\|.1\|60 | x | x | x | .2\|.1\|50 | .1\|.1\|55 | .1\|.1\|45 | .1\|.1\|55 | .1\|.1\|50 | .2\|0\|50 | .1.0\|55 | .1\|0\|55 | .1\|0\|55 |
| heat step time(min)\|pH\| | 30\|4.5 | 30\|3.5 | x | x | x | 50\|3.3 | 50\|3.1 | 60\|4.0 | 55\|3.7 | 50\|3.7 | 55\|3.5 | 55\|4.0 | 60\|3.5 | 70\|5.0 |
| dipping conc AA %\|Cys %\| CD % | 0 | 0 | 0 | 0 | 0 | .1\|0\|0 | .1\|0\|0 | .1\|0\|0 | .1\|0\|0 | .1\|0\|.1 | .2\|.1\|0 | 0.1\|0\|0 | .1\|0\|0 | .1\|0\|0 |
| dipping conc Na$_2$H$_2$P$_2$O$_7$%\| NaHSO$_3$% | 0\|0 | 0\|0 | 0\|0 | 0\|0 | 0\|0 | 0\|0 | 0\|0 | 0\|0 | 0\|0 | 0\|0 | 0\|0 | 0\|0 | 0\|0 | 0\|0 |
| temp drying C. | 70 | 70 | 80 | 80 | 80 | 60 | 60 | 60 | 60 | 60 | 60 | 60 | 60 | 60 |

| | Sesuiterpene Lactones (SL), ppm | | | | | | | | | | | | | |
|---|---|---|---|---|---|---|---|---|---|---|---|---|---|---|
| | WF 14 | WF 15 | WF 16 | WF 17 | WF 18 | WF 19 | WF 20 | WF 21 | WF 22 | WF 23 | WF 24 | WF 25 | WF 06 | |
| Dihydro Lactucin Glycoside | 256 | 224 | 219 | 377 | 204 | 39.8 | 110.6 | 178 | 209 | 0 | 76.9 | 0 | 195 | |
| Dihydro Lactucin Oxalate | 0 | 25 | 40.5 | 62.4 | 66.9 | 41.8 | 3.527 | 32.9 | 39.1 | 0 | 54.7 | 0 | 472 | |
| Lactucin Glycoside | 0 | 4.4 | 0 | 3.49 | 7.67 | 0 | 0 | 4.47 | 1.62 | 4.15 | 3.21 | 0 | 330 | |
| Lactucin Oxalate | 2.9 | 53 | 359 | 383 | 499 | 224 | 9.275 | 206 | 175 | 11.3 | 223 | 0 | 8007 | |
| Dihydro Lactucin (dih lax) | 2.4 | 117 | 83.5 | 40 | 126 | 71.7 | 3.443 | 63.8 | 82.6 | 9.42 | 171 | 0 | 802 | |
| Lactucin (lac) | 0 | 28 | 25.1 | 20.2 | 50.9 | 23.8 | 0 | 18.5 | 28.5 | 15.2 | 299 | 0 | 7449 | |
| Deoxylactucin Glycoside | 0 | 8 | 9.69 | 18.4 | 15.9 | 6.81 | 0 | 0 | 0 | 0 | 0 | 0 | 130 | |
| Dihydro Deoxylactucin Glycoside | 2.7 | 0 | 2.94 | 2.71 | 0 | 0 | 3.219 | 7.24 | 2.9 | 0 | 0 | 0 | 0 | |
| Deoxylactucin Oxalate | 8.7 | 27 | 81.5 | 141 | 142 | 49 | 6.553 | 49.1 | 53.7 | 33.2 | 41.2 | 0 | 2860 | |
| Dihydro Deoxylactucin Oxalate | 0 | 4.8 | 6.81 | 14.7 | 11.6 | 5.54 | 0 | 5.7 | 7.18 | 17.2 | 5.15 | 0 | 46 | |
| Deoxylactucin (Dolax) | 0 | 16 | 6.5 | 0 | 18.1 | 8.61 | 0 | 6.75 | 8.82 | 5.2 | 94.2 | 0 | 2568 | |
| Dihydro Deoxylactucin (Dih dolac) | 0 | 23 | 13.4 | 9.7 | 21.2 | 11.8 | 0 | 10.9 | 14.9 | 36.7 | 35.7 | 0 | 44 | |
| Lactucopricrin Oxalate + Dihydro Lactucopricin Oxalate | 0 | 3.9 | 175 | 157 | 201 | 7.77 | 5.385 | 78.3 | 47.6 | 30.3 | 23.1 | 0 | 4294 | |
| Lactucopricrin (LCP) + Dihydrolactucopricin (dih lcp) | 14 | 30 | 26 | 23.6 | 37.4 | 21.5 | 16.57 | 26.6 | 25 | 18.7 | 46.5 | 16 | 2741 | |
| Total Sesquiterpene Lactones (ppm) | 287 | 564 | 1049 | 1253 | 1401 | 521 | 158.6 | 687 | 696 | 181 | 1074 | 16 | 29938 | |
| Ranking conc SL | 4 | 6 | 11 | 15 | 16 | 5 | 2 | 7 | 8 | 3 | 14 | 1 | | |
| Residual SL % | 6 | 12 | 23 | 27 | 30 | 11 | 3 | 15 | 15 | 4 | 23 | <1 | | |
| Bitterness (Taste Panel (5)); scale 0-10 0 = no bitterness avg. over >5 scores; rounded per 0.5 unit | 0.5 | 1.5 | 2 | 2 | 3.5 | 2 | 0.5 | 3 | 2.5 | 1 | 4.5 | 0 | 10 | |
| Total: lac + lcp + dolax + dihlac, Dihlcp, dihdolax | 16 | 153 | 154 | 94 | 253 | 161 | 20 | 127 | 161 | 84 | 647 | 16 | | |
| Ranking conc SL | 1 | 6 | 7 | 4 | 12 | 8 | 2 | 5 | 8 | 3 | 23 | 1 | | |
| Process (I, II, III) | II/III | I/II | II | II | II | III | II/III | II/III | II/III | II/III | I | **) | II ***) | |

TABLE 1-continued

Overview trials eliminating bitter precursors and components in vegetable (Asteraceae).

| Process conditions | | | | | | | | | | | |
|---|---|---|---|---|---|---|---|---|---|---|---|
| pre-treatment AA %\|CA %\|peeling (y/n) | .2\|.1\|y | .1\|.1\|y | .2\|.1\|y | .1\|0\|y | .2\|0\|n | .2\|0\|y | .2\|0\|y | .2\|0\|y | .2\|0\|y | .1\|0\|n | .1\|0\|n |
| heat step AA %\|CA %\|temp C. | .1\|.1\|50 | .2\|.1\|55 | .1\|0\|50 | .1\|0\|55 | .1\|0\|60 | .1\|0\|50 | .1\|0\|50 | .1\|0\|50 | .1\|0\|50 | .1\|0\|55 | .1\|0\|60 |
| heat step time(min)\|pH\| | 50\|4.5 | 55\|4.5 | 60\|4.2 | 60\|4.5 | 45\|4.3 | 60\|4.2 | 6.0\|4.2 | 6.0\|4.2 | 60\|4.2 | 50\|4.5 | 55\|4.5 |
| dipping conc AA %\|Cys %\|CD % | .1\|.1\|0 | .1\|0\|.1 | .2\|0\|0 | .2\|0\|0 | .1\|0\|0 | .2\|.05\|0 | .1\|0\|0 | .1\|0\|.1 | .05\|.05 | .1\|.05\|0 | .05\|0\|0 |
| dipping conc Na$_2$H$_2$P$_2$O$_7$%\|NaHSO3% | 0\|0 | 0\|.05 | 0\|0 | .05\|0 | 0\|0 | .05\|0 | .05\|.05 | 0\|.02 | .05\|0 | 0\|.02 | 0\|0 |
| temp drying C. | 60 | 60 | 60 | 60 | 60 | 85 | 85 | 85 | 85 | 85 | 85 |

%: w/w liquid
*no treatment (triplo): root shredded; 50 min, no addition, at 25° C.; dried at 80° C. for 3 hr
**) pure inulin, commercial product
***) bitter components collected during Process II, III It was observed that samples WF14, WF15, WF20 and WF23 contained low concentrations of total sesquiterpene lactones (287.1; 564; 159 and 181 ppm, respectively) and were comparable to readings for pure inulin (WF25; 16 ppm of SL). The residual SL concentrations for samples WF20, WF23, WF14 were 3, 4, 5 and 14%, respectively, while that for pure inulin was less than 1%. In contrast, the residual concentration of the sesquiterpene lactones (SL) for non-treated samples WF03A, WF03B, WF03C was 100%. The panel assessed bitterness for WF14, WF15, WF20 and WF23 as 0.5; 1.5; 0.5; and 1, respectively, while for pure inulin (WF25) as 0 or no bitterness, and for negative control (samples WF03A, WF03B and WF03C) as 10 or extremely bitter. The results of the bitterness taste demonstrated that samples processing by Processes II and III almost completely eliminated bitterness from the high fiber vegetable matter.

Samples were also assessed for the presence of the following six sesquiterepene lactones: lactucin (lac), lactucopicrin (lcp), deoxylactucin (dolax), dihydrolactucopicrin (dihlcp) and dihydro deoxylactucin (dih dolac). It was observed that total concentrations of these sesquiterpene lactones, expressed as lactucin ppm, for WF14, WF17, WF20 and WF23 were 16, 94, 20, and 84, respectively, while for inulin WF25 was observed to be 16. WF14 was ranked 1 for the SL concentrations similarly to the ranking of pure inulin.

It was confirmed that Processes I-VI (WHOLE FIBER PROCESS; WFP) provide almost complete removal of bitter components from the high fiber vegetable products and provide significant benefits compared to the standard commercial Inulin Process (INP). In particular, the INP requires an extraction step at elevated temperatures while WFP does not apply such a step. The INP separates "insoluble" such as Insoluble fibers and proteins from the main process stream and the "wet" products are discharged as animal feed and/or compost. The "insolubles" in WFP are retained in the final product and contribute to the overall wholesome nutritional value of WFP-based products. In order to recover inulin in a spray or dried form, all other "solubles," such as minerals, peptides, etc., have to be removed through a system of cation or anion exchange and activated carbon columns. Regeneration of the resins with strong acids or base adds to the total "soluble" effluent stream, which is treated before discharge. WFP retains the natural minerals, most K, Ca, organic acids, peptides etc. WFP create side fewer streams containing solubles than INP. The overall recovery of inulin-product in the INP is approximately 67-72% of solids of the original raw material (solids). The overall recovery of WFP is approximately 95-99% (of solids) of the original raw material (solids). The reduction in capital investments and operational costs for WFP versus INP results in substantial cost-effective WFP. Additionally, WFP has a low "ecological footprint" while INP contributes to a substantial "ecological footprint."

The high fiber vegetable products prepared by WFP provide "good" or "excellent" source of fiber in various food applications.

A range of applications (Examples 2-6 and 8-15) were tested with 2 variations:
Standard: 100% flour;
10-15% of flour in the formulation was substituted with an equal quantity "Vegetable Product". "Vegetable Product" refers to a dry powder, treated according to Process I-III and containing 85% (w/w) Dietary Fiber.
In Example 7 the Inulin fraction was substituted with equal quantity of Vegetable Product, a dry powder containing 85% (w/w) Dietary Fiber.

Example 2. Bread Roll, White Flour

In this example, the base formulation included the following ingredients:
1. Flour: 280 or 252 g
2. Vegetable Product (VP): 0 or 28 g
3. Water: 118 g
4. Salt: 7.5, 5 or 2.5 g
5. Yeast: 7.5 g
6. Sugar: 15 g
8. Vegetable oil: 22.5 g
Serving size: 70 g (1 roll)
Dietary Fiber per serving (with VP): 5 g
Conclusions: No bitter taste was detected in the bread rolls produced with VP. No difference was detected in size of the bread rolls that included VP compared to the size of the bread rolls produced from 100% AP flour. No difference in color was noticed in the bread rolls that included VP compared with conventional products. No difference was detected in the texture of the bread rolls made with VP compared to the texture of the bread rolls produced from AP flour only. No difference in sweetness was noticed in the bread rolls that included VP when compared to the conventional products. No differences in process or time were required to produce the bread rolls from the VP containing flour compared to the conventional products produced from AP flour.

Example 3. Bread Roll, Whole Wheat/While Flour

In this example, the formulation included the following ingredients:
1. AP (All Purpose) flour: 140 or 129 g+Whole wheat flour: 140 or 129 g
2. Vegetable Product (VP): 0 or 42 g
3. Water: 118 g
4. Salt: 5 g
5. Yeast: 7.5 g
6. Sugar: 15 g
7. Vegetable oil: 23 g
Serving size: 70 g (1 roll)
Dietary Fiber per serving (with VP): 12 g
Conclusions: No bitter taste was detected in the bread rolls that included VP. Rolls with VP were slightly smaller in size compared to the size of the bread rolls produced from 100% wheat/white flour. No difference in color, texture or sweetness was detected in the bread rolls made with VP compared to the conventional products. No differences in process or time were required to produce the bread rolls from VP flour compared to the conventional products produced with wheat/white flour.

Example 4. Hamburger Bun

In this example, the base formulation included the following ingredients:
1. AP Flour: 203 or 183 g
2. Vegetable Product (VP): 0 or 20 g
3. Whole egg: 60 g
4. Water: 118 g
5. Butter: 21 g
6. Nonfat powder milk: 16 g
7. Potato flour: 16 g
8. Sugar: 10 g
9. Yeast: 3.5 g
10. Salt: 1.5 g
Serving size: 90 g (1 bun)
Dietary Fiber per serving (with VP): 5 g
Conclusions: No bitter taste was detected in the hamburger bun made with flour that included VP. No difference in size was observed in the hamburger buns made with VP compared to the size of the hamburger buns produced from 100% flour. No difference in color was noticed the hamburger buns made with flour that included VP compared with conventional products made from 100% flour. No difference was noticed in texture of the hamburger buns made with flour that include VP compared to the texture of the hamburger buns produced from 100% flour. No difference in sweetness was noticed in the hamburger buns that included VP when compared to the conventional products. No differences in process or time were required to produce the hamburger buns from VP flour compared to the conventional products produced from 100% flour.

Example 5. Tortilla, White Flour

In this example, the base formulation included the following ingredients:
1. AP flour: 225 or 203 g.
2. Vegetable Product (VP): 0 or 20 g
3. Water: 81 g
4. Vegetable oil: 9 g
5. 6. Salt 1.5 g
Serving size: 60 g
Dietary Fiber per serving (with VP): 5 g
Conclusions: No bitter taste was detected in tortillas made with VP. No difference in size was observed in products made with VP compared to products made from 100% AP flour. Products made with VP were slightly darker in color compared to the conventional products. No difference in texture was detected in products made with VP and conventional products. No difference in sweetness was noticed in all products. No differences in process or time were required to produce the tortillas made from VP flour compared to the conventional products.

Example 6. Tortilla, Whole Wheat/White Flour

In this example, the base formulation included the following ingredients:
1. AP flour: 112 or 102 g+Whole wheat flour: 112 or 102 g
2. Vegetable Product (VP): 0 or 20 g
3. Water: 81 g
4. Vegetable oil: 9 g
5. Salt: 1.5 g
Serving size: 60 g
Dietary Fiber per serving (with VP): 12 g
Conclusions: No bitter taste was detected in tortillas made with VP. No difference in size was observed in tortillas made with VP and tortillas produced from 100% wheat flour. Products with VP were slightly darker in color compared to products made with 100% AP flour. No difference in texture was detected in tortillas made with VP and tortillas produced from AP flour. No difference in sweetness was noticed when tortillas made with VP were compared to the conventional products. No differences in process or time were required to produce the tortillas made with VP flour compared to the conventional products.

Example 7. Cereal Bar, High Fiber

In this example, the base formulation included the following ingredients:
1. Inulin: 6 or 0 g
2. Vegetable Product (VP): 0 or 6 g
3. Maltose syrup: 16 g
4. Peanut butter: 15 g
6. Oat flakes: 13 g
7. Rice crisps: 4 g
Serving size: 50 g
Dietary Fiber per serving (with VP): 8 g
Conclusions: No bitterness was detected in cereal bars produced with VP. No difference in size was observed in cereal bars made with and without VP. No difference in texture was detected for cereal bars made with or without VP. No difference in sweetness was noticed in products made with or without VP. No differences in process or time were required to produce cereal bars that included VP compared to the conventional product

Example 8. Cookies

In this example, the base formulation included the following ingredients:
1. AP flour: 108 or 98 g
2. Vegetable Product (VP): 0 or 11 g
3. Salt: 3 g
4. Butter: 75 g
5. Sugar: 93 g
6. Brown sugar: 87 g
7. Vanilla: 3 g
8. Egg: 60 g
Serving size: 100 g
Dietary Fiber per serving (with VP): 3 g
Conclusions: No bitter taste was detected in cookies made with VP. Small difference in size was observed in the cookies made with VP compared to the cookies produced from 100% AP flour. Cookies made with VP were thinner and larger than cookies made of AP flour only. No difference in color was noticed in the cookies made with VP and conventional products made with 100% AP flour. No difference was detected in texture of the cookies made with VP and produced with AP flour. No difference in sweetness was noticed in the cookies made with VP and cookies made with AP flour. No differences in process or time were required to produce the cookies from VP flour compared to the conventional cookies

Example 9. Cake

In this example, the base formulation included the following ingredients:
1. Cake flour: 120 or 108 g
2. Vegetable Product: 0 or 12 g
3. Sugar: 100 g
4. Baking powder: 5 g
5. Salt: 3 g
6. Milk: 100 g
7. Shortening: 34 g
8. Egg: 60 g
9. Vanilla: 3 g
Serving size: 60 g
Fiber per serving size with VP: 3 g
Conclusions: No bitter taste was detected in the cakes made with VP. No difference in size was detected in the cakes made with VP compared to the size of the cakes produced from 100% flour. No difference in color was noticed in the cakes made with VP compared to the cakes produced with 100% flour. No difference was detected in texture of the cakes made with VP compared to the texture of the cakes produced with 100% flour. No difference in sweetness was noticed when the cakes made with VP were compared to the conventional products. No differences in process or time were required to produce the cakes with VP compared to the reference product.

Example 10. Pasta

In this example, the base formulation included the following ingredients:
1. AP flour: 120 or 111 g
2. Vegetable Product (VP): 0 or 9 g
3. Egg: 60 g
Serving size: 120 g
Dietary Fiber per serving (with VP): 5 g
Conclusions: No bitter taste was detected in the pasta made with VP. No difference in size was detected in pasta made with VP compared to the size of pasta made with 100% flour. VP product was slightly lighter in color compared to the conventional products made with 100% flour. No difference in sweetness was noticed when pasta made with VP, was compared to the conventional products. No differences in process or time were required to produce pasta that included VP compared to the conventional products.

Example 11. Tortilla Chip (Fried)

In this example, the base formulation included the following ingredients:
1. Corn meal: 90 or 83 g
2. Vegetable Product (VP): 0 or 7 g
3. Water: 100 g
4. Salt: 5 g
Serving size: 40 g
Dietary Fiber per serving (with VP): 3 g
Conclusions: No bitter taste was detected in the tortilla chip made with treated VP. No difference in size was detected in the tortilla chips made with VP compared to the size of the conventional tortilla chips made with 100% corn meal. VP products were slightly darker in color compared to the tortilla chips made with 100% corn meal. No difference was detected in texture of the tortilla chips made with VP compared to the texture of the conventional the tortilla chips. No difference in sweetness was noticed when the tortilla chips made with VP were compared to the conventional products. No differences in process or time were required to produce the tortilla chips made with VP compared to the conventional products.

Example 12. Tortilla Chip (Baked)

In this example, the base formulation included the following ingredients:
1. Corn meal: 90 or 83 g
2. Vegetable Product (VP): 0 or 7 g
3. Water: 100 g
4. Salt: 5 g
Serving size: 40 g
Dietary Fiber per serving (with VP): 3 g
Conclusions: No bitter taste was detected in the tortilla chips made with VP. No difference in size was detected in the tortilla chips made with VP compared to the size of the conventional tortilla chips made with 100% corn meal. VP products were slightly darker in color compared to the tortilla chips made with 100% corn meal. No difference was detected in texture of the tortilla chips made with VP compared to the texture of the conventional the tortilla chips. No difference in sweetness was noticed when the tortilla chips made with VP were compared to the conventional products. No differences in process or time were required to produce the tortilla chips made with VP compared to the conventional products.

Example 13. Muffin

In this example, the base formulation included the following ingredients:
1. AP flour: 60 or 56 g
2. Vegetable Product (VP): 0 or 4 g
3. Sugar: 30 g
4. Baking powder: 3 g
5. Salt: 1 g
6. Egg: 12 g
7. Milk: 35 g 8. Vegetable oil: 7 g
Serving size: 120 g
Dietary Fiber per serving (with VP): 3 g Conclusions: No bitter taste was detected in muffins made with treated VP. No noticeable difference in size of the muffins made with VP compared to the size of the conventional muffins. No difference in color was noticed in the muffins made with VP compared to the conventional muffins. No difference was detected in texture of the muffins made with VP compared to the texture of the muffins that did not include VP. No difference in sweetness was noticed in the muffins made with VP when compared to the conventional products. No differences in process or time were required to produce the muffins having VP compared to the conventional product.

Example 14. Brownie

In this example, the base formulation included the following ingredients:
1. AP flour: 70 or 59 g
2. Vegetable Product (VP): 0 or 11 g
3. Butter: 76 g
4. Sugar: 164 g
5. Nutella: 50 g
6. Egg: 80 g
7. Cocoa powder: 34 g
8. Salt: 2 g
9. Baking powder: 2 g
10. Vanilla extract: 3 g
11. Chocolate chips: 94 g
Serving size: 100 g
Dietary Fiber per serving (with VP): 3 g Conclusions: No bitter taste was detected in the brownies made with treated VP. No noticeable difference in size was detected in the brownies that included VP compared to the size of the conventional products that did not include VP. No difference in color was noticed in the brownies made with VP and the conventional products. No difference in texture was detected in the brownies that included VP and the brownies that did not include VP. No difference in sweetness was noticed when the brownies made with VP were compared to the conventional products. No differences in process or time were required to produce the brownies that included VP compared to the conventional products produced from AP flour.

The references cited throughout this application are incorporated for all purposes apparent herein and in the references themselves as if each reference was fully set forth. For the sake of presentation, specific ones of these references are cited at particular locations herein. A citation of a reference at a particular location indicates a manner(s) in which the teachings of the reference are incorporated. However, a citation of a reference at a particular location does not limit the manner in which all of the teachings of the cited reference are incorporated for all purposes.

What is claimed is:

1. A method of manufacturing a fiber rich chicory product by inhibiting production of, inactivating, or removing bitter components produced in a root of a chicory plant, the method comprising the following steps performed in order:
    a) cutting off at least one of the top and tail of the chicory plant thereby obtaining the chicory root;
    b) bathing, dipping or rinsing the chicory root with a solution comprising water, ascorbic acid and optionally at least one further substance of an antioxidant, a textural support agent and an organic acidulant, for 1 to 45 minutes, wherein the solution is at a temperature of 5° C. to 20° C., and wherein the ascorbic acid is present at a concentration of 0.01 to 2% (w/w) to inhibit production of, inactivate, and/or remove the bitter components, and wherein each of the at least one further substance when present is at a concentration of 0.01 to 2% (w/w);
    c) reducing the size of the chicory root by one or more of dicing, shredding and slicing the chicory root;
    d) dipping the size-reduced chicory root in water at a temperature of 0° C. to 20° C. for 1 to 300 seconds, wherein the dipping water includes at least ascorbic acid, and optionally at least one of citric acid, erythorbic acid, lactic acid, gluconic acid, malic acid, potassium ascorbate, potassium citrate, potassium erythorbate, potassium lactate, potassium gluconate, sodium ascorbate, sodium citrate, sodium erythorbate, sodium lactate, sodium gluconate, sodium malate, cyclodextrin, sodium pyrophosphate, sodium acid pyrophosphate, potassium pyrophosphate, potassium acid pyrophosphate, L-cysteine, L-cysteine-HCL, thiol containing peptides, papaya extract, proteases, sodium bisulfite, potassium bisulfite, EDTA, $CaCl_2$, Ca-lactate, Ca-gluconate, and Ca-lactategluconate, and wherein the ascorbic acid is present at a concentration of 0.01 to 2% (w/w);
    e) removing moisture from the size-reduced chicory root; and
    f) further processing the size-reduced chicory root in at least one of the following ways:
        i) drying the size-reduced chicory root at 50° C. to 90° C. followed by grinding and/or milling to produce a fiber rich powder,
        ii) fresh packaging the size-reduced chicory root,
        iii) frying the size-reduced chicory root, or
        iv) collecting bitter components from the size-reduced chicory root; and
    wherein w/w is weight relative to total weight of dry solids.

2. The method according to claim 1, wherein step a) includes cutting of both the top and the tail of the chicory plant and also peeling the chicory plant.

3. The method according to claim 2, wherein the solution of step b) further includes citric acid.

4. The method according to claim 3, wherein the dipping water of step d) includes the L-cysteine.

5. The method according to claim 4, wherein the dipping water of step d) includes the sodium pyrophosphate at a concentration of 0.1 to 1% (M/V).

6. The method according to claim 5, wherein the dipping water of step d) includes the cyclodextrin.

7. The method according to claim 1, wherein the dipping step d) is performed for 10 to 120 seconds.

8. The method according to claim 1, wherein the moisture removing step e) includes passing dry air around and/or through the sized-reduced chicory root.

9. The method according to claim 1, wherein after step b) and before step c) bitter components are collected.

10. The method according to claim 1, further comprising washing the chicory plant prior to step a).

11. The method according to claim 1, wherein the fiber rich chicory product has 70 to 90% (w/w) total dietary fiber, 30% to 79% (w/w) inulin and soluble fiber other than inulin.

* * * * *

UNITED STATES PATENT AND TRADEMARK OFFICE
CERTIFICATE OF CORRECTION

PATENT NO. : 12,433,309 B2
APPLICATION NO. : 17/735487
DATED : October 7, 2025
INVENTOR(S) : Frederik S. Kaper Page 1 of 1

It is certified that error appears in the above-identified patent and that said Letters Patent is hereby corrected as shown below:

On the Title Page

Item (63) Under the heading "Related U.S. Application Data":
Replace: "(63) Continuation of application No. 14/784,155, filed as application No. PCT/US2014/344409 on Apr. 16, 2014, now Pat. No. 11,350,654"
With: "(63) Continuation of application No. 14/784,155, filed as application No. PCT/US2014/034409 on Apr. 16, 2014, now Pat. No. 11,350,654"

Signed and Sealed this
Twenty-third Day of December, 2025

John A. Squires
*Director of the United States Patent and Trademark Office*